(12) United States Patent
Jang et al.

(10) Patent No.: US 10,149,016 B2
(45) Date of Patent: Dec. 4, 2018

(54) MOBILE TERMINAL AND METHOD FOR CONTROLLING THE SAME

(71) Applicant: LG ELECTRONICS INC., Seoul (KR)

(72) Inventors: Myoungho Jang, Seoul (KR); Sooyoung Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 141 days.

(21) Appl. No.: 15/210,055

(22) Filed: Jul. 14, 2016

(65) Prior Publication Data
US 2017/0078755 A1    Mar. 16, 2017

(30) Foreign Application Priority Data

Sep. 10, 2015  (KR) .................. 10-2015-0128604

(51) Int. Cl.
*H04N 21/482*    (2011.01)
*G06F 3/0486*    (2013.01)
*H04N 21/472*    (2011.01)
*G06F 3/0488*    (2013.01)
*G06F 3/0481*    (2013.01)
*G06F 3/0484*    (2013.01)
*H04N 21/414*    (2011.01)
(Continued)

(52) U.S. Cl.
CPC ....... *H04N 21/4825* (2013.01); *G06F 3/0484* (2013.01); *G06F 3/0486* (2013.01); *G06F 3/04817* (2013.01); *G06F 3/04842* (2013.01); *G06F 3/04886* (2013.01); *H04N 21/4126* (2013.01); *H04N 21/41407* (2013.01); *H04N 21/42224* (2013.01); *H04N 21/47217* (2013.01); *H04N 21/4821* (2013.01)

(58) Field of Classification Search
None
See application file for complete search history.

(56) References Cited

U.S. PATENT DOCUMENTS

2005/0086692 A1\* 4/2005 Dudkiewicz ....... H04N 5/44543
725/46
2005/0278739 A1  12/2005 Yaksick et al.
(Continued)

OTHER PUBLICATIONS

European Search Report dated Dec. 5, 2016 issued in Application No. 16001758.8.

*Primary Examiner* — Jason K Lin
(74) *Attorney, Agent, or Firm* — KED & Associates, LLP

(57) ABSTRACT

The present invention relates to a mobile terminal performing wireless communication with a video output device for outputting a received broadcast content, the mobile terminal including a wireless communication unit capable of transmitting a media content outputtable by the video output device to the video output device, a touch screen divided into a first region outputting an icon corresponding to the media content, and a second region including a time bar extending in one direction to indicate a time, and a channel bar indicating output time information related to each of a plurality of broadcast contents and extending in the one direction, and a controller capable of controlling the touch screen to output an output bar indicating a reproduction time of the media content on a part of the second region, when a drag touch applied to the icon is released on the second region.

22 Claims, 23 Drawing Sheets

(51) Int. Cl.
*H04N 21/41* (2011.01)
*H04N 21/422* (2011.01)

(56) References Cited

U.S. PATENT DOCUMENTS

| | | | |
|---|---|---|---|
| 2012/0110620 A1* | 5/2012 | Kilar | G06Q 30/02 725/34 |
| 2012/0266093 A1* | 10/2012 | Park | G06F 3/0486 715/769 |
| 2013/0347037 A1* | 12/2013 | Soroushian | H04N 21/26258 725/39 |
| 2014/0094943 A1 | 4/2014 | Bates et al. | |
| 2016/0062569 A1* | 3/2016 | Jenkins | G06F 3/0482 715/716 |
| 2016/0142783 A1* | 5/2016 | Bagga | H04N 21/47214 725/47 |
| 2016/0241806 A1* | 8/2016 | Ogle | H04W 4/21 |

* cited by examiner

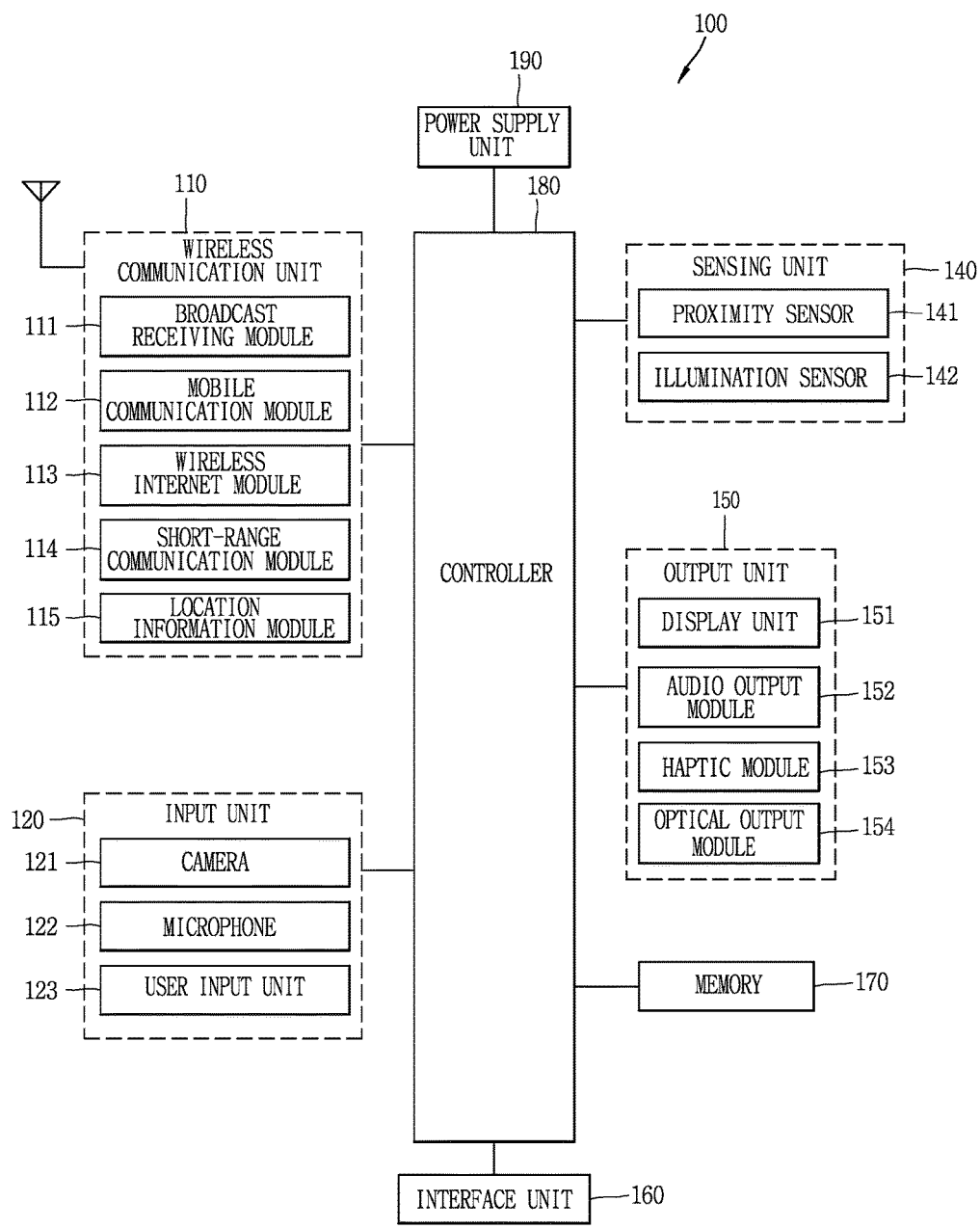

(a)

(b)

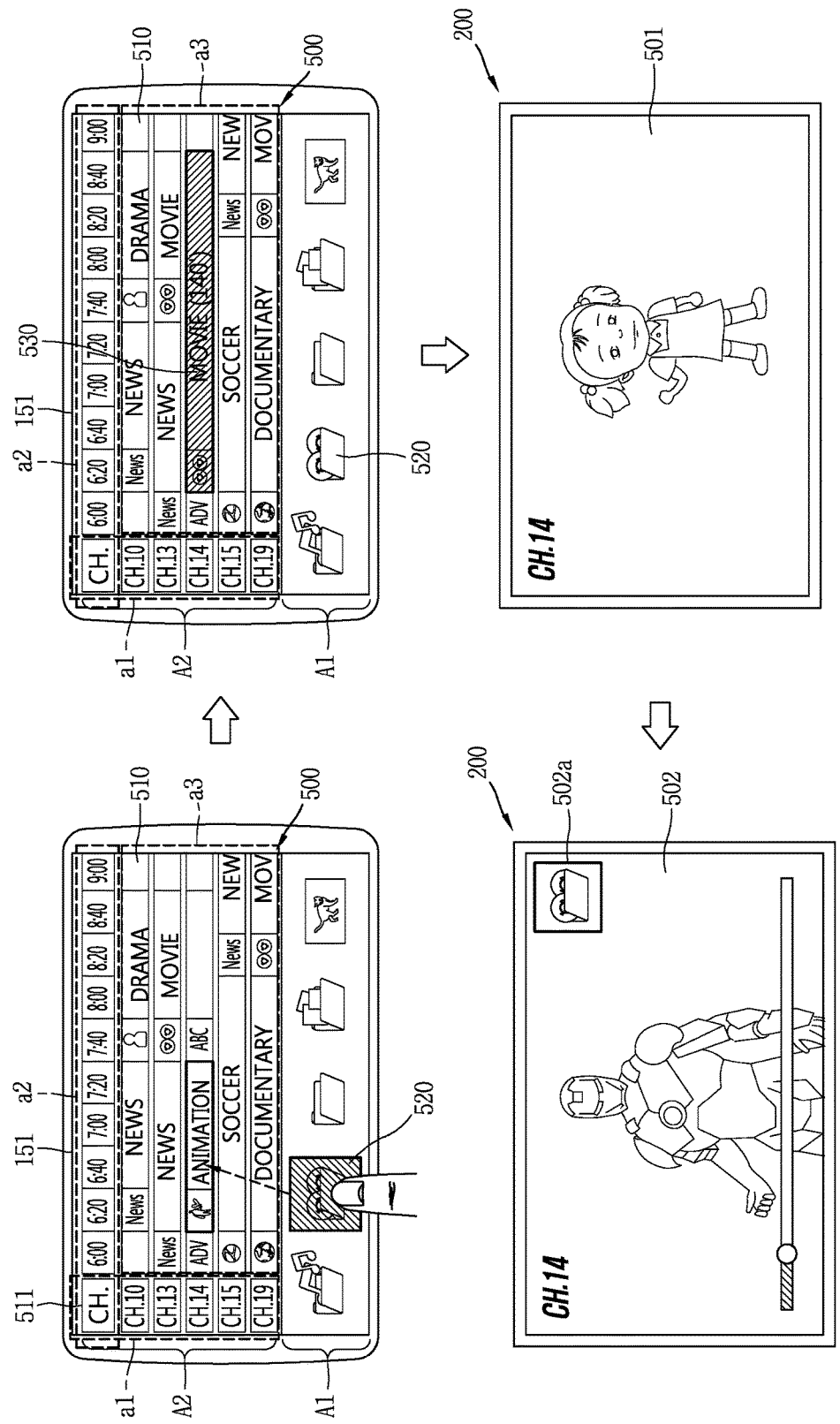

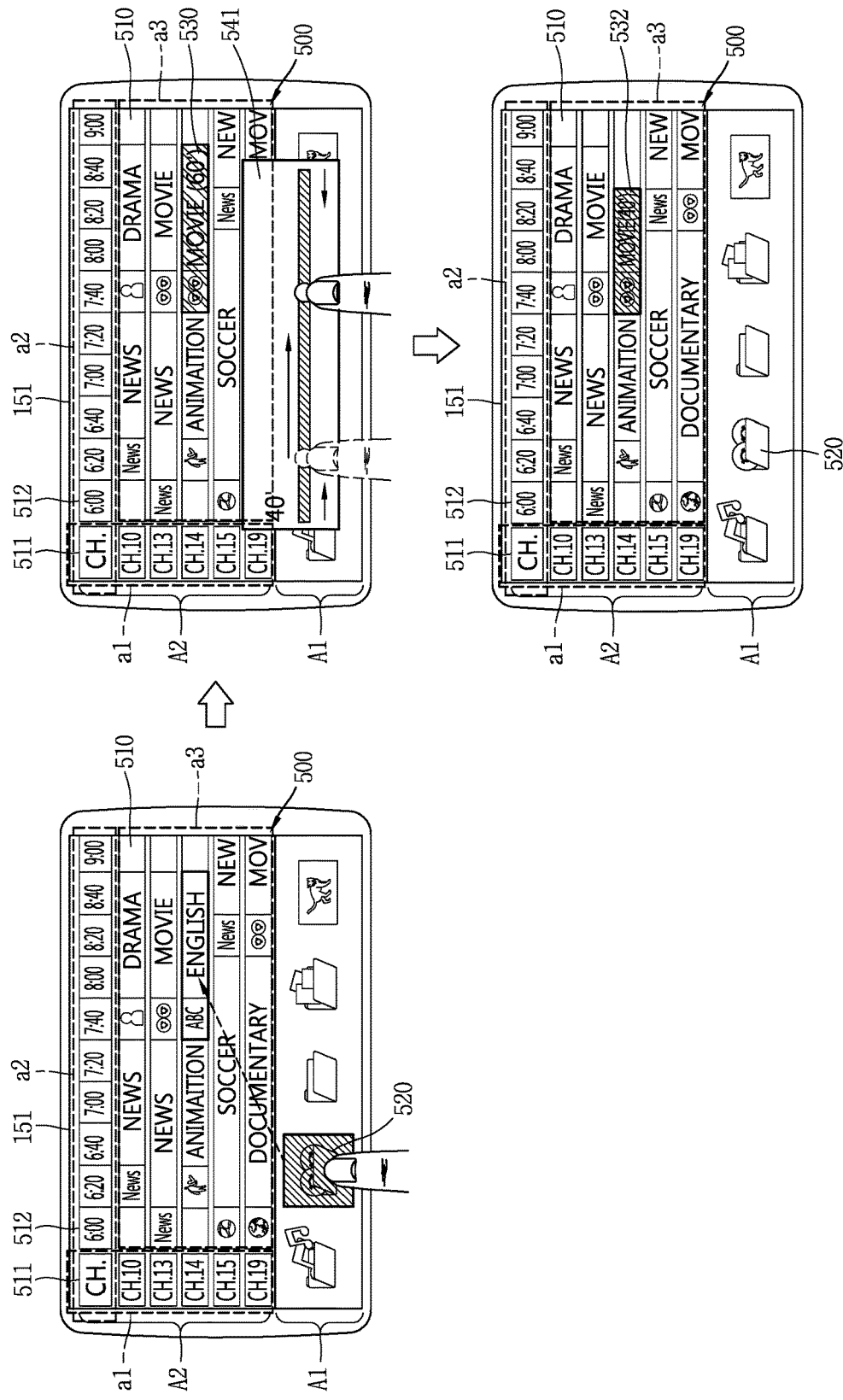

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2015-0128604, filed on Sep. 10, 2015, the contents of which is incorporated by reference herein in its entirety.

BACKGROUND OF THE INVENTION

1. Field of the Invention

This specification relates to a mobile terminal capable of performing wireless communication with a video output device.

2. Background of the Invention

A mobile terminal include any type of device, which includes a battery and a display, outputs information on the display using power supplied from the battery, and is portable by a user. The mobile terminals include devices of recording and reproducing videos, and devices of displaying graphic user interfaces (GUIs). Also, the mobile terminals include notebook computers, cellular phones, glasses and watches capable of displaying screen information, game machines and the like.

As it becomes multifunctional, a mobile terminal can be allowed to capture still images or moving images, play music or video files, play games, receive broadcast and the like, so as to be implemented as an integrated multimedia player. Many efforts include not only changes and improvement of structural components implementing a mobile terminal but also software improvement to support and improve functions of the terminal.

The related art video output device (image output apparatus) is generally controlled by an external input device (e.g., a remote controller). However, in recent time, a terminal can perform functions of the external input device. That is, the terminal can turn on/off a video output device, change a channel or output mode of the video output device, or adjust a volume of the video output device, through wireless communication. Also, a technology of providing contents stored in a mobile terminal on a video output device is under development.

However, when desiring to output the contents stored in the mobile terminal on the video output device, an additional control stage should be performed to cooperate with the mobile terminal during output of a broadcast image or video through a channel, which causes user's inconvenience.

SUMMARY OF THE INVENTION

Therefore, an aspect of the detailed description is to control a media content of a mobile terminal to be more easily output on a video output device using an electronic program guide (EPG) screen.

To achieve these and other advantages and in accordance with the purpose of this specification, as embodied and broadly described herein, there is provided a mobile terminal capable of performing wireless communication with a video output device for outputting a received broadcast content, the mobile terminal including a wireless communication unit capable of transmitting a media content outputtable by the video output device to the video output device, a touch screen divided into a first region outputting an icon corresponding to the media content, and a second region including a channel bar indicating output information related to a plurality of broadcast contents according to a flow of time and extending in one direction, and a controller capable of outputting an output bar indicating a reproduction time of the media content on a part of the second region and generating a control command for outputting the media content on the video output device, when a drag touch applied to the icon is released on the second region.

In accordance with one embodiment disclosed herein, the controller may calculate an output time based on a reproduction time of a selected media content, and generate the channel bar with a length corresponding to the output time.

This may facilitate a user to edit the output time of the media content.

In accordance with one embodiment disclosed herein, the controller may control the media content to be output on a specific channel or at a specific time, by applying a touch to channel information or a time bar, which may result in a seamless control of the output of the media content.

In accordance with the present invention, the user can be provided with a media content stored in a mobile terminal, without an additional control command, while viewing a broadcast content through a video output device, by setting a reproduction of the media content with respect to a specific channel.

The user can thus set a time and channel information for outputting the media content in advance, and does not have to perform executing an application of the cooperative mobile terminal and receiving the media content from the mobile terminal.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1A is a block diagram of a mobile terminal in accordance with one exemplary embodiment of the present invention;

FIG. 4B is a conceptual view illustrating the control method of FIG. 4A;

FIGS. 5A to 5D are conceptual views illustrating a control method of setting an output bar;

DETAILED DESCRIPTION OF THE INVENTION

Figure 1B:
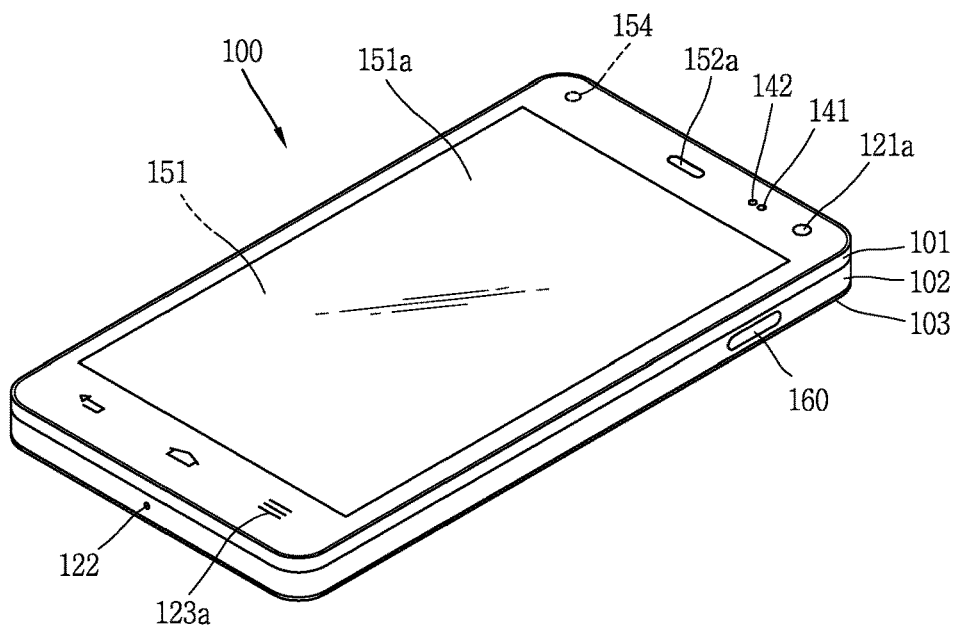
FIGS. 1B and 1C are conceptual views illustrating one example of a mobile terminal, viewed from different directions.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1C:
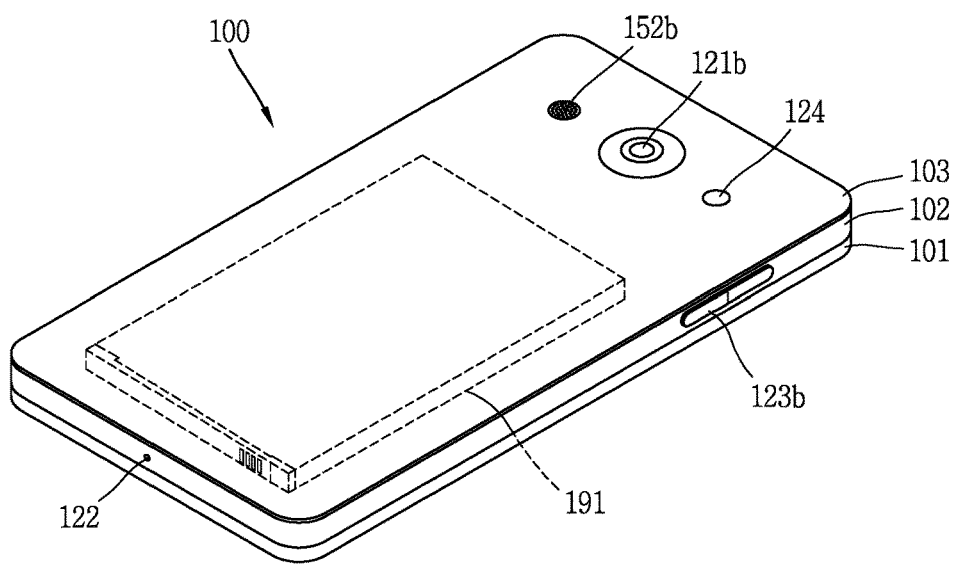

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

The wireless communication unit 110 includes one or more of a broadcast receiving module 111, a mobile communication module 112, a wireless Internet module 113, a short-range communication module 114, and a location information module 115.

The input unit 120 includes a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) is obtained by the input unit 120 and may be analyzed and processed according to user commands.

The sensing unit 140 is typically implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 is typically configured to output various types of information, such as audio, video, tactile output, and the like. The output unit 150 is shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal 100. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs (information or signals) to the mobile terminal 100. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function (or an application program) being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact.

The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched region, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule alarm, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided on the rear surface of the terminal body, new types of user interfaces using the rear input unit can be implemented. Embodiments that include the aforementioned touch screen or the rear input unit may implement some or all of the functionality of the first manipulation unit 123*a* provided on the front surface of the terminal body. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

A flash 124 is shown adjacent to the second camera 121*b*. When an image of a subject is captured with the camera 121*b*, the flash 124 may illuminate the subject.

The second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, a video output device that may perform wireless communication with a mobile terminal according to one embodiment of the present invention, which includes at least one of the aforementioned elements, will be described.

Figure 2:
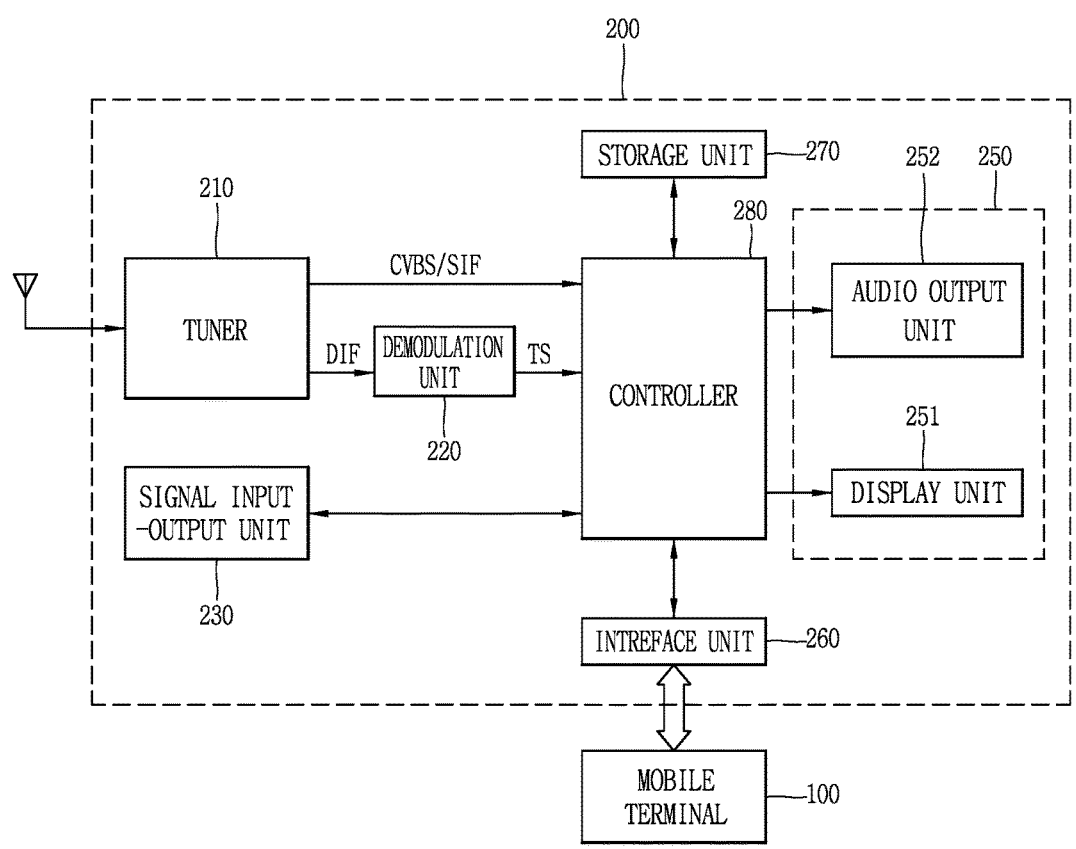
FIG. 2 is a block diagram of a video output device (image display apparatus) in accordance with the present invention.

FIG. 2 is a block diagram illustrating a video output device according to the present invention.

In this specification, the video output device includes all of a device for receiving and displaying a broadcasting signal, a device for recording and playing moving images, and a device for recording and playing audio. Hereinafter, the image display device which is a television will be described exemplarily.

FIG. 2 is a block diagram illustrating a video output device 200 according to the present invention. The video output device 200 includes a tuner 210, a demodulator 220, a signal input and output unit 230, an interface unit 260, a controller 280, a storage unit (memory) 270, a display unit 251, and an audio output unit 252. Also, the video output device 200 may further include an external input device. The external input device is an external device that may remotely control the video output device 200, and may include a remote controller and a mobile terminal 100, for example. Hereinafter, the external input device which is the mobile terminal 100 according to the present invention will be described exemplarily.

Referring to FIG. 2, the tuner 210 selects a radio frequency (RF) broadcast signal corresponding to a user-selected channel from RF broadcast signals received via an antenna, and converts the selected RF broadcast signal into an intermediate frequency signal or a baseband video or audio signal. For example, when the selected RF broadcast signal is a digital broadcast signal, the tuner 210 converts the RF broadcast signal into a digital IF signal (DIF). On the other hand, when the RF broadcast signal is an analog broadcast signal, the tuner 210 converts the RF broadcast signal into an analog baseband video or audio signal (CVBS/SIF). As described above, the tuner 210 may be a hybrid tuner that may process the digital broadcast signal and the analog broadcast signal.

The digital IF signal (DIF) output from the tuner 210 may be input to the demodulator 220, and the analog baseband video or audio signal (CVBS/SIF) output from the tuner 210 may be input to the controller 280. The tuner 110 may receive an RF broadcast signal of a single carrier according to an advanced television system committee (ATSC) mode or RF broadcast signal of multiple carriers according to digital video broadcasting (DVB) mode.

Although one tuner 210 is shown, the video output device 200 may include a plurality of tuners, for example, first and second tuners without limitation to FIG. 2. In this case, the first tuner may receive a first RF broadcast signal corresponding to a user-selected broadcast channel, and the second tuner may receive second RF broadcast signals corresponding to previously stored broadcast channels sequentially or periodically. The second tuner may convert the RF broadcast signal into a digital IF signal (DIF) or analog baseband video or audio signal (CVBS/SIF) in the same manner as the first tuner.

The demodulator 220 receives the digital IF signal (DIF) converted by the tuner 210 and then performs a demodulation operation on the received signal (DIF). For example, if the digital IF signal output from the tuner 210 follows the ATSC mode, the demodulator 220 performs 8-VSB (8-vestigal side band) demodulation. At this time, the demodulator 220 may perform channel decoding such as trellis decoding, de-interleaving, and Reed-Solomon decoding. To this end, the demodulator 220 may include a trellis decoder, a de-interleaver, a Reed Solomon decoder and the like.

For another example, if the digital IF signal output from the tuner 210 follows the DVB mode, the demodulator 220 may perform coded orthogonal frequency division modulation (COFDMA). At this time, the demodulator 220 may perform channel decoding such as convolution decoding, de-interleaving, and Reed-Solomon decoding. To this end, the demodulator 220 may include a convolution decoder, a de-interleaver, a Reed Solomon decoder and the like.

The signal input and output unit 230 may be connected to an external device to perform signal input and output operations. To this end, the signal input and output unit 230 may include an audio/video (A/V) input and output unit (not shown) and a wireless communication unit (not shown).

The A/V input and output unit may include an Ethernet terminal, a USB terminal, a CVBS (Composite Video Banking Sync) terminal, a component terminal, an S-video terminal (analog), a DVI (Digital Visual Interface) terminal, an HDMI (High Definition Multimedia Interface) terminal, an MHL (Mobile High-definition Link) terminal, an RGB terminal, a D-SUB terminal, an IEEE 1394 terminal, an SPDIF terminal, a Liquid HD terminal, and the like. The digital signal input through these terminals may be forwarded to the controller 280. At this time, the analog signal input through the CVBS terminal and the S-video terminal may be converted to the digital signal through an analog-to-digital converter (not shown) and forwarded to the controller 280.

The wireless communication unit may perform wireless Internet access. For example, the wireless communication unit may perform wireless Internet access by using WLAN (Wireless LAN) (Wi-Fi), Wibro (Wireless broadband), Wimax (World Interoperability for Microwave Access), HSDPA (High Speed Downlink Packet Access), and the like. Also, the wireless communication unit may perform short range wireless communications with other electronic devices. For example, wireless communication unit may perform short range wireless communications by using Bluetooth, radio frequency identification (RFID), infrared data association (IrDA), ultra wideband (UWB), ZigBee, and the like.

Also, the wireless communication unit may perform wireless communication with the mobile terminal 100 through wireless communication. For example, the wireless communication unit may forward a video signal, an audio signal and a data signal, which are received through the wireless communication unit 110 of the mobile terminal 100, to the controller 280. Also, the wireless communication may transmit the video signal, the audio signal and the data signal, which are transmitted from the controller 280, to the mobile terminal 100 through wireless communication.

The signal input and output unit 230 may forward video signals, audio signals and data signals, which are provided from an external device such as a Digital Versatile Disk (DVD) player, a Blu-ray player, a game device, a camcorder, a computer (e.g., notebook computer), a portable device, and a smart phone, to the controller 280. Also, the signal input and output unit 230 may forward video signals, audio signals and data signals of various media files stored in an external storage device such as a memory device and a hard disk to the controller 280. Also, the signal input and output unit 230 may output the video signals, the audio signals and the data signals, which are processed by the controller 280, to another external device.

The signal input and output unit 230 may be connected to a set-top box, for example, a set-top box for Internet Protocol TV (IPTV), through at least one of the above-described terminals to enable signal input and output operations. For example, the signal input and output unit 230 may forward video signals, audio signals and data signals, which are processed by the set-top box for IPTIV, to the controller 280 so as to enable bidirectional communication, and may forward the signals processed by the controller 280 to the set-top box for IPTV. In this case, the IPTV may include ADSL-TV, VDSL-TV, FTTH-TV, and the like, which are identified from one another in accordance with a transmission network.

The digital signal output from the demodulator 220 and the signal input and output unit 230 may include a stream signal (TS). The stream signal TS may be a signal where a video signal, an audio signal and a data signal are multiplexed. For example, the stream signal may be MPEG-2 Transport Stream (TS) where a video signal of an MPEG-2 specification and an audio signal of Dolby AC-3 specification are multiplexed. In this case, the MPEG-2 TS may include a 4 byte header and a 184 byte payload.

The interface unit 260 may receive an input signal for power control, channel selection and screen setup from the external input device (mobile terminal 100) or transmit the signal processed by the controller 280 to the external input device (mobile terminal 100). The interface unit 260 and the external input device (mobile terminal 100) may be connected with each other in a wired manner or wirelessly.

An example of the interface unit 260 may include a sensor unit. The sensor unit is configured to sense an input signal from an external input device, for example, a remote controller or the mobile terminal 100.

A network interface unit (not shown) provides an interface for connecting the video output device 200 with wire/wireless networks including Internet network. The network interface unit may include an Ethernet terminal, for example, for wire network connection. Wireless LAN (WLAN)(Wi-Fi), Wireless broadband (Wibro), World Interoperability for Microwave Access (Wimax), High Speed Downlink Packet Access (HSDPA) may be used for the wireless network connection.

The network interface unit (not shown) may be connected to a predetermined web page through a network. That is, the network interface unit may transmit or receive data to or from a corresponding server by accessing a predetermined web page through a network. In addition, the network interface unit may receive contents or data provided by a contents provider or a network manager. That is, the network interface unit may receive contents, such as movies, advertisements, games, VOD and broadcast signals, and contents related information, which are provided from a contents provider or network provider, through a network. Also, the network interface unit may receive update information and update files of firmware provided by the network manager. Also, the network interface unit may transmit data to Internet or contents provider or network manager.

Also, the network interface unit may select and receive a desired one of applications opened to the public, through a network.

The controller 280 may control an overall operation of the video output device 200. In more detail, the controller 280 is configured to control generation and output of an image. For example, the controller 280 may control the tuner 210 to allow a user to tune the RF broadcast signal corresponding to the user-selected channel or previously store channel. Although not shown, the controller 280 may include a demultiplexer, an image processor, an audio processor, a data processor, an on screen display (OSD) generator, and the like. Also, the controller 280 may include a CPU or peripheral devices in hardware.

The controller 280 may demultiplex a stream signal TS, for example, an MPEG-2 TS to separate it into a video signal, an audio signal, and a data signal.

The controller 280 may process the demultiplexed video signal, for example, perform decoding for the demultiplexed video signal. In more detail, the controller 280 may decode a coded video signal of the MPEG-2 specification by using an MPEG-2 decoder, and may decode a coded video signal of the H.264 specification according to a digital multimedia broadcasting (DMB) mode or a DVB-H by using an H.264 decoder. Also, the controller 280 may process the video signal to adjust brightness, tint, color, and the like, of an image. The video signal processed by the controller 280 may be forwarded to the display unit 251 or may be forwarded to an external output device (not shown) through an external output terminal.

The controller 280 may process the demultiplexed audio signal, for example, decoding for the demultiplexed audio signal. In more detail, the controller 280 may decode the coded audio signal of the MPEG-2 specification by using an MPEG 2 decoder, decode the coded audio signal of an MPEG 4 bit sliced arithmetic coding (BSAC) according to a DMB mode by using an MPEG 4 decoder, and decode the coded audio signal of the advanced audio codec (AAC) specification of MPEG 2 according to a satellite DMB mode or DVB-H by using an AAC decoder. Also, the controller 280 may process base, treble, volume control, and the like. The audio signal processed by the controller 280 may be forwarded to the audio output unit 252, for example, a speaker, or may be forwarded to the external output device.

The controller 280 may process an analog baseband video or audio signal (CVBS/SIF). In this case, the analog baseband video or audio signal (CVBS/SIF) input to the controller 280 may be an analog baseband video or audio signal output from the tuner 210 or the signal input and output unit 230. The processed video signal may be displayed through the display unit 251, and the processed audio signal may be output through the audio output unit 252.

The controller 280 may process the demultiplexed data signal, for example, perform decoding for the demultiplexed data signal. In this case, the data signal may include electronic program guide (EPG) information including a start time, an end time, or the like of a broadcast program broadcasted in each channel. In an ATSC mode, the EPG information may include ATSC-program and system information protocol (ATSC-PSIP) information, and in a DVB mode, the EPG information may include DVB-service information (DVB-SI). The ATSC-PSIP information or the DVB-SI may be included in a header (4 byte) of an MPEG-2 TS.

The controller 280 may perform a control operation to process OSD. In more detail, the controller 280 may generate an OSD signal for displaying various types of information in a graphic or text form on the basis of at least one of a video signal and a data signal or an input signal received from the external input device (mobile terminal 100). The OSD signal may include various types of data such as a user interface screen, a menu screen, a widget, an icon, and the like.

The memory 270 may store a program for signal processing or controlling of the controller 280, or may store a processed video signal, audio signal, and data signal. The memory 270 may include at least one of a flash memory, a hard disk type memory, a multimedia card micro type memory, a card type memory (e.g., an SD or XD memory), a random access memory (RAM), a static RAM (SRAM), a read-only memory (ROM), an electrically erasable programmable ROM (EEPROM), a programmable ROM (PROM), a magnetic memory, a magnetic disk, and an optical disk.

The display unit 251 may convert the video signal, the data signal, the OSD signal, and the like, which are processed by the controller 150, into RGB signals to generate a driving signal. As a result, the display unit 251 outputs an image. The display unit 251 may be implemented in various forms such as a plasma display panel (PDP), a liquid crystal display (LCD), a thin film transistor-LCD (TFT-LCD), an organic light emitting diode (OLED) display, a flexible display, a three-dimensional (3D) display, an e-ink display, and the like. Also, the display unit 251 may be implemented as a touch screen to serve as an input device.

The audio output unit 252 may output an audio signal, for example, a stereo signal or a 5.1-channel signal, which is processed by the controller 150. The audio output unit 252 may be implemented as various types of speakers.

Meanwhile, an image capturing unit (not shown) for capturing an image of the user may be further provided. The image capturing unit (not shown) may be implemented as, but not limited to, a single camera. The image capturing unit may be implemented as a plurality of cameras. Image information captured by the image capturing unit (not shown) may be input to the controller 280.

Meanwhile, in order to sense a user gesture, as described above, a sensing unit (not shown) including at least one of a touch sensor, a voice sensor, a position sensor, and an operating sensor may be further provided in the video output device 200. A signal sensed by the sensing unit (not shown) may be forwarded to the controller 280 through the interface unit 260.

The controller 280 may sense a user gesture according to the image captured by the image capturing unit (not shown) or the signal sensed by the sensing unit (not shown), separately, or by combining these signals.

A power supply unit (not shown) supplies a corresponding power to the video display device 200. In particular, the power supply unit (not shown) may supply a power to the controller 280 that may be implemented in the form of a system on chip (SOC), the display unit 251 for displaying an image, and the audio output unit 252 for outputting audio.

To this end, the power supply unit (not shown) may include a converter (not shown) for converting an alternating current (AC) power into a direct current (DC) power. Meanwhile, for example, in the case that the display unit 251 is implemented as a liquid crystal panel having a plurality of backlight lamps, the power supply unit (not shown) may further include an inverter (not shown) that may be able to perform a pulse width modulation (PWM) operation for the purpose of varying luminance or dimming driving.

The external input device (mobile terminal 100) may be connected to the interface unit 260 in a wired manner or wirelessly, and may transmit an input signal generated according to a user input to the interface unit 260. The external input device (mobile terminal 100) may include a remote controller, a mouse, a keyboard, and the like. The remote controller may transmit an input signal to the interface unit 260 through Bluetooth, RF communication, infrared communication, ultra-wideband (UWB), ZigBee, and the like. The remote controller may be implemented as a spatial remote control device. The spatial remote control device may generate an input signal by sensing an operation of a body in a space.

The video output device 200 may be implemented as a fixed type digital broadcast receiver capable of receiving at least one of an ATSC-type (8-VSB-type) digital broadcast, a DVB-T type (COFDM-type) digital broadcast, an ISDB-T type (BST-OFDM-type) digital broadcast, and the like. Also, the video output device 200 may be implemented as a mobile digital broadcast receiver capable of receiving at least one of a terrestrial digital multimedia broadcasting-type digital broadcast, a satellite DMB-type digital broadcast, an ATSC-M/H type digital broadcast, a DVB-H type (COFDM type) digital broadcast, a media forward link only type digital broadcast, and the like. Also, the video output device 200 may be implemented as a digital broadcast receiver for a cable, satellite communication, and an IPTV.

Hereinafter, embodiments according to the mobile terminal configured as above and the control method that may be implemented in the video output device will be described with reference to the accompanying drawings. It will be apparent to those skilled in the art that the present invention may be embodied in another specific form within the range that does not depart from spirits and essential features of the present invention.

Figure 3:
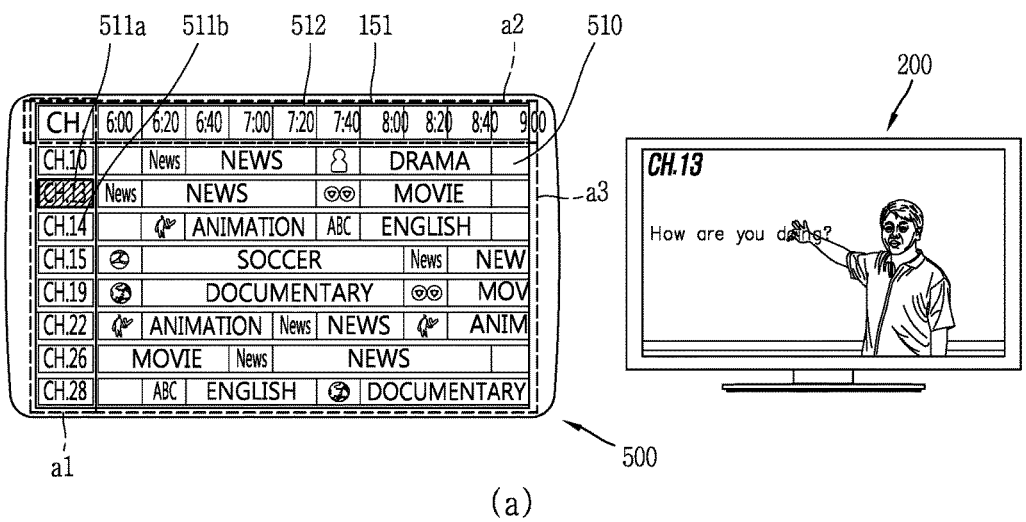
FIG. 3 is a conceptual view illustrating an electronic program guide (EPG) in accordance with one exemplary embodiment of the present invention.
Figure 3:
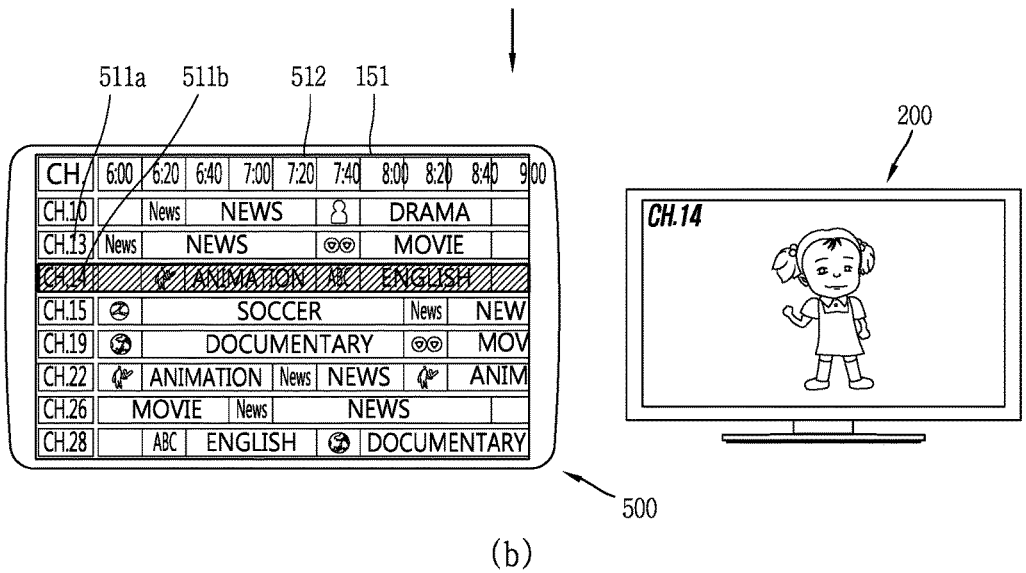

FIG. 3 is a conceptual view illustrating an electronic program guide (EPG) in accordance with one exemplary embodiment of the present invention.

Referring to FIG. 3, the mobile terminal 100 and the video output device 200 may guide programs of broadcasts (e.g., terrestrial broadcasting, cable, satellite broadcasting, IPTV, etc.) which can be output on the video output device 200, and output an electronic program guide (EPG) 500 providing a broadcast schedule. The EPG 500 can be implemented in the form of a popup window, screen information and the like. The EPG 500 may be displayed along with or in a manner of overlapping a program (video) output on the video output device 200. Also, while the EPG 500 is output, the program (video) output on the video output device 200 may be output in a changed output size (e.g., reduced in size).

The EPG 500 may be divided into a first part a1 for outputting a plurality of channel information, a second part a2 for outputting time information (and weather information), and a third part a3 for outputting a plurality of channel bars indicating broadcast contents.

A time bar 512 which indicates a flow of time and extends in one direction may be output on the second part a2.

A plurality of channel information 511*a* and 511*b* which are arranged in a direction intersecting with the one direction may be output on the first part a1. Each of the channel information may be configured to inform of programs (videos) broadcasted for each broadcast management server (broadcaster, broadcasting station) and for each broadcast channel on the time/date basis. Each of the channel information 511*a* and 511*b* may include a number given to a channel and a specific name of the channel.

The third part a3 may include a plurality of channel bars 510*a* and 510*b*, which correspond to the plurality of channel information 511*a* and 511*b*, respectively, and on which images corresponding to a plurality of broadcast contents (programs) according to broadcast signals received from each broadcast management server are arranged according to a flow of time. Each channel bar 510*a* and 510*b* may extend in the one direction.

Also, the EPG 500 may include an indicator 500' indicating a current time. This may allow the user to recognize a type of a broadcast content corresponding to a current channel information.

The video output device 200 may receive a broadcast signal (or a broadcast-associated signal) from a broadcast management server through a broadcast channel (or a channel), and output a program (video) corresponding to the broadcast signal using at least one of the display unit 251 and the audio output unit 252. The program (video) may include at least one of a video, a still image, and audio data.

Here, the channel information related to the video output device 200 may include a channel number of a channel (broadcast channel) through which the video output device 200 receives the broadcast signal from the broadcast management server, a name of a broadcasting station (broadcaster) transmitting the broadcast signal through the channel, information (e.g., a program name, a start/end time of a program, etc.) related to a program (video) broadcasted (output) through the channel, and the like.

Meanwhile, on the touch screen 151 of the mobile terminal 100 according to the present invention, as illustrated in (a) of FIG. 3, may output the EPG 500 associated with the video output device 200 which is connected to perform wireless communication. The EPG 500 output on the touch screen 151 of the mobile terminal 100 may include channel information related to the video output device 200 connected to perform the wireless communication. Examples of the channel information may include a channel number of at least one channel provided in the video output device 200, a name of the channel, information (program name) related to a video broadcasted through the channel, etc.

The controller 180 of the mobile terminal 100 may output the EPG 500 on the touch screen 151 in various manners.

For example, when the mobile terminal 100 is connected to the video output device 200 through the wireless communication unit 110 to perform wireless communication, the controller 180 may receive information related to an EPG from a wireless communication unit of the video output device 200. The EPG-related information may be the very EPG or information (e.g., channel information) necessary to generate the EPG.

Upon receiving the information (e.g., channel information) required for generating the EPG from the video output device 200, the controller 180 may generate the EPG 500 using the received information.

The controller 180 may also output the EPG 500 associated with the video output device 200 on the touch screen 151 using the EPG-related information.

However, the present invention may not be necessarily limited to this. The controller 180 may also receive the EPG-related information directly from the broadcast management server through the wireless communication unit 110.

The EPG 500 may also be generated in the broadcast management server and then transmitted to at least one of the mobile terminal 100 and the video output device 200, or generated in at least one of the mobile terminal 100 and the video output device 200 based on a broadcast-associated signal (a broadcast signal, program-related information, etc.) received from the broadcast management server.

The present invention can output the EPG 500 associated with the video output device 200 on the mobile terminal 100, other than the video output device 200, which can prevent the EPG 500 from interfering with the user while the user views the video output device 200.

Although not illustrated, it may also be obvious that the EPG can be output on the display unit 251 of the video output device 200.

The present invention may be configured to control the video output device 200 using the EPG 500 output on the touch screen 151 of the mobile terminal 100.

FIG. 3 exemplarily illustrates one example in which first channel information 511a and second channel information 511b are included in the EPG 500 output on the touch screen 151 of the mobile terminal 100.

The video output device 200 may receive a broadcast signal through a first channel corresponding to the first channel information 511a. In this instance, a broadcast content corresponding to the broadcast signal received through the first channel may be output (broadcasted) on the display unit 151 of the video output device 200.

Here, receiving a broadcast signal through a channel may include the meaning of selecting a broadcast signal corresponding to a channel selected by a user among broadcast signals received from broadcast management servers through the tuner 210 of the video output device 200 (or the broadcast receiving module 111 of the mobile terminal 100).

That is, the channel may refer to a path (transmission path) for receiving the broadcast signal, or a number (channel number) for identifying a broadcast signal received from each broadcast management server.

Also, for the sake of explanation, the terms "outputting a video received through a channel" or "outputting a broadcast content corresponding to a channel" will be used hereinafter. This may refer to "receiving a broadcast signal through a channel and outputting a broadcast content (program) corresponding to the received broadcast signal" or "selecting a broadcast signal corresponding to a channel (number) selected by a user and outputting an image or video corresponding to the selected broadcast signal."

When a video corresponding to the first channel is currently output on the video output device 200, the controller 180 may apply a graphic effect to the first channel information 511a corresponding to the first channel, among those channel information included in the EPG 500, to be visually distinguished from the other channel information, so as to guide that the video received through the first channel is currently output on the video output device 200.

In this state, according to the present invention, as illustrated in (a) of FIG. 3, the second channel information 511b, which is different from the first channel information 511a, may be selected (or touched) on the EPG 500 output on the touch screen 151 of the mobile terminal 100. In this instance, as illustrated in (b) of FIG. 3, the first channel corresponding to the first channel information 511a which is set on the video output device 200 may be changed into a second channel corresponding to the second channel information 511b, and a broadcast content received through the second channel may be output on the display unit 251 of the video output device 200. That is, when one of the channel information included in the EPG 500 is selected, a broadcast content received through a channel corresponding to the selected channel information can be output on the display unit 251 of the video output device 200.

In detail, when the second channel information 511b included in the EPG 500 output on the touch screen 151 is selected, the controller 180 may transmit information notifying the selection of the second channel information 511b (or information related to the second channel) to the video output device 200 through the wireless communication unit 110.

When the information notifying the selection of the second channel information 511b is received from the mobile terminal 100, the controller 280 of the video output device 200 may output a broadcast content received through the second channel corresponding to the second channel information 511b on the display unit 251 of the video output device 200.

In this instance, on the EPG 500 output on the touch screen 151 of the mobile terminal 100, a graphic effect may be applied to the second channel information 511b corresponding to the second channel so as to notify that the broadcast content received through the second channel is output on the video output device 200.

With the configuration, the present invention can provide a user interface which allows the EPG of the video output device to be output on the mobile terminal, and the video output device to be controlled by using the EPG.

Meanwhile, the EPG 500 may be edited such that a media content (information), which is outputtable on the mobile terminal 100, can be output on the video output device 200, or an additional channel corresponding to the media content (information) may be generated. In detail, the controller 180 may control a media content outputtable on the mobile terminal 100 to be output on the video output device 200, in response to a user request.

The media content outputtable on the mobile terminal 100 may include a video, a still image, a 3D stereoscopic image, at least one image, text, an execution screen of an application, and the like. Any type of content may be outputtable without a limit if it corresponds to a visually outputtable content. Also, the image or video outputtable on the mobile terminal 100 may be an image or video stored in the memory 170, an image or video received from an external server on an Internet through wireless communication, or the like.

The controller 180 may apply (reflect, set, store) the media content outputtable on the mobile terminal 100 to a virtual channel. The media content applied to the virtual channel may be output on the video output device 200 according to a flow of time.

The mobile terminal disclosed herein can output the media content, which is stored therein and outputtable on the video output apparatus 200, on the EPG 500 such that the media content can be output on the video output device 200 at a specific time.

Figure 4A:
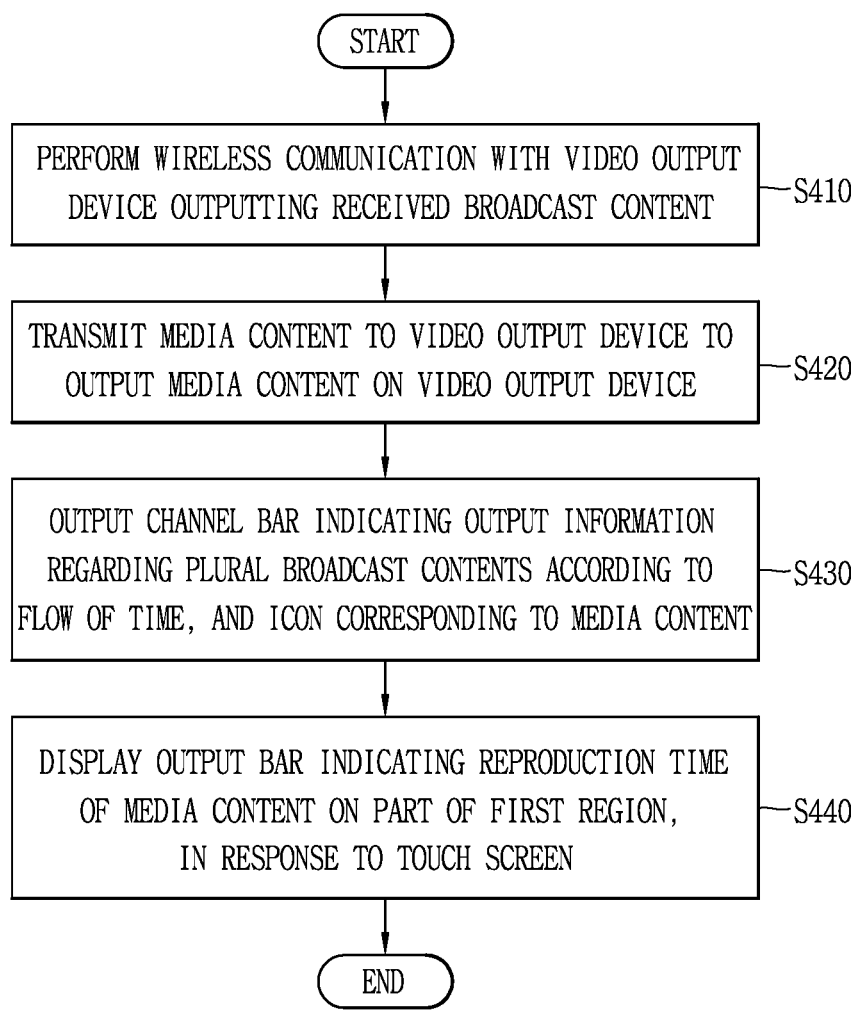
FIG. 4A is a conceptual view illustrating a method for controlling a mobile terminal in accordance with one exemplary embodiment of the present invention.

FIG. 4A is a conceptual view illustrating a method for controlling a mobile terminal in accordance with one exemplary embodiment of the present invention, and FIG. 4B is a conceptual view illustrating the control method of FIG. 4A.

As illustrated in FIGS. 4A and 4B, the mobile terminal 100 may perform wireless communication with the video output device 200 which outputs broadcast contents (S410). For example, when the mobile terminal 100 is located adjacent to the video output device 200, the controller 180 of the mobile terminal 100 may perform the wireless communication with the video output device 200. The controller 180 may control the wireless communication unit 110 to transmit a media content outputtable by the video output device 200 to the video output device 200 (S420). The media content may be stored in the memory 170 of the mobile terminal 100 or generated by an application installed on the mobile terminal 100.

The controller 180 may also receive EPG information 500 which includes information related to the content from the video output device 200. Accordingly, a channel bar indicating output information according to a flow of time and an icon corresponding to the media content may be output on the touch screen 151 (S430).

When a wireless connection is established with the video output device 200, the controller 180 may divide the touch screen 151 into first and second regions A1 and A2. The EPG 500 may then be output on the first region A1 and at least one icon 520 corresponding to the media content may be output on the second region A2. Referring back to FIG. 3, the EPG 500 output on the first region A1 may include the first part a1 for outputting the plurality of channel information 511, the second part a2 for outputting the time bar 512 indicating the time information (and weather information), and the third part a3 for outputting the plurality of channel bars 510 indicating broadcast contents.

The icon 520 may correspond to an icon which corresponds to one media content or an application associated with the media content, an icon corresponding to a folder (including a plurality of applications or a plurality of files) generated by a user, but a shape of the icon may not be necessarily be limited to this. The channel bar 510 corresponding to one channel may include broadcast contents which are arranged according to a flow of time and distinguished from one another. That is, the channel bar 510 may include a plurality of images which are arranged in the one direction and correspond to the broadcast contents, respectively. If a broadcast content corresponding to a specific channel is not present (not scheduled) at a specific time, an empty space may be formed without an image corresponding to the broadcast content.

The controller 180 may control the touch screen 151 to output an output bar 530, in response to a touch applied to the first icon 520 and the second region A2 (S440).

In detail, when a drag touch starting from (initially applied to) the icon 520 is released on the second region A2, the output bar 530 may be generated. Also, the controller 180 may generate a control command for outputting a media content corresponding to the icon 520 on the video output device 200. The wireless communication unit 110 may transmit the control command to the video output device 200. For example, the wireless communication unit 110 may transmit the control command to the video output device 200 at a time point that the output bar 530 is generated, namely, at a specific time on a time bar 512 corresponding to the output bar 530.

Referring to FIG. 4B, when the drag touch starting from the icon 520 is released on one channel bar 510 output on the second region A2, the output bar 530 may be generated on the one channel bar 510. The controller 180 may select channel information for outputting the media content corresponding to the icon 520 on the basis of the released point of the drag touch. In more detail, the controller 180 may control the touch screen 151 to generate (output) the output bar 530, starting from a time point when an image of a broadcast content corresponding to the released point of the drag touch is output. Also, the controller 180 may generate a control command for outputting the media content corresponding to the selected icon 520 at the time point when the output of the image is started.

Accordingly, when a broadcast content of a selected channel CH. 14 of the selected channel bar 510 is currently output, the video output device 200 may output the media content at a time designated by the output bar 530. When the mobile terminal 100 is wirelessly connected to the video output device 200, the mobile terminal 100 can transmit every media content to the video output device 200, but the present invention may not be necessarily limited to this.

For example, the controller 180 may first output the icons corresponding to the media contents outputtable on the video output device 200 along with the received EPG information 500, and then transmit a media content corresponding to a selected icon to the video output device 200 after the output bar 530 is generated. Accordingly, the media content to which items changed until before the output bar 530 is generated are applied can be provided to the video output device 200 after establishing the wireless connection between the video output device 200 and the mobile terminal 100.

The output bar 530 may be output on a part of the channel bar 510 to indicate a reproduction time of the media content corresponding to the selected icon 520. The output bar 530 may be generated to have a length corresponding to that of the time bar 512. The output bar 530 may be output in an overlapping manner with the channel bar 510, and accordingly, may obscure one region of the channel bar 510 or may be output semitransparent such that the one region of the channel bar 510 is visible.

The controller 180 may generate a reproduction time through the video output device 200 based on a time for which the media content is reproduced. For example, when the media content is a video, the reproduction time may correspond to an entire time from start to end of the video if the video is played at normal speed. On the other hand, when the media content is an image which is irrespective of a flow of time, the reproduction time may be generated based on a preset reference output time and a number of images.

The output bar 530 may include text information, image information and the like, which indicate the media content. The output bar 530 may include an output time corresponding to a length of the output bar 530. The output bar 530 may be generated in a different shape from that of the channel bar 510.

Referring to FIG. 4B, while outputting a broadcast content 501 on the selected channel, when a time set by the output bar 530 comes, a selected media content 502 may be output. Here, the output broadcast content 501 may correspond to a broadcast content corresponding to one region of the channel bar 510, in which the output bar 530 is not included ("ADV" in FIG. 4B). That is, the video output device 200 may continuously output the media content 502 received from the mobile terminal 100, other than a video by a broadcast signal, at a time based on the output region of the output bar 530, while viewing the broadcast content 501 corresponding to the channel CH. 14.

Although not illustrated in detail, when setting the output bar 530 corresponding to a media content with respect to specific channel information, the video output device 200 may output the media content even while outputting a broadcast content of another channel information. That is, when the user has set a media content with respect to arbitrary channel information, the video output device 200 can output the set media content even though any channel is selected at a corresponding time.

The video output device 200 may also output an icon 502a associated with the media content together with the media content.

Although not illustrated in detail, when another channel is selected based on the EPG output on the touch screen 151, the controller 180 may generate a control command for outputting a broadcast content corresponding to the another channel on the video output device 200.

According to this exemplary embodiment, the user can be provided with a media content without an additional control command while viewing a broadcast content through the video output device, in a manner of setting the reproduction of the media content stored in the mobile terminal to a specific channel.

This may allow the user to preset a time and channel information for outputting a media content, and thus there may not be required for executing an application of the mobile terminal cooperating with the video output device and receiving the media content from the mobile terminal.

Hereinafter, a control method of adjusting an output time of the media content will be described with reference to FIG. 4C. The controller 180 may output the output bar 530 on one region of the channel bar 510, in response to a drag touch which is initially applied to the icon 520 and released on the second region A2.

The output bar 530 may be generated based on an output time, which is calculated based on a capacity of the media content corresponding to the icon 520 and a preset reproduction time of the media content. A length of the output bar 530 may correspond to the output time of the media content.

The controller 180 may adjust the length of the output bar 530 when a touch is applied to the output bar 530. Here, the touch applied to the output bar 530 may correspond to a drag touch. When the touch is applied, the length of the output bar 530 may increase or decrease in real time. The touch may preferably be applied to an edge of the output bar 530.

When the length of the output bar 530 is changed, the controller 180 may adjust the output time of the media content. For example, the controller 180 may adjust a reproduction speed of the media content or control only some of a plurality of media contents corresponding to the icon 520 to be output.

Figure 4C:
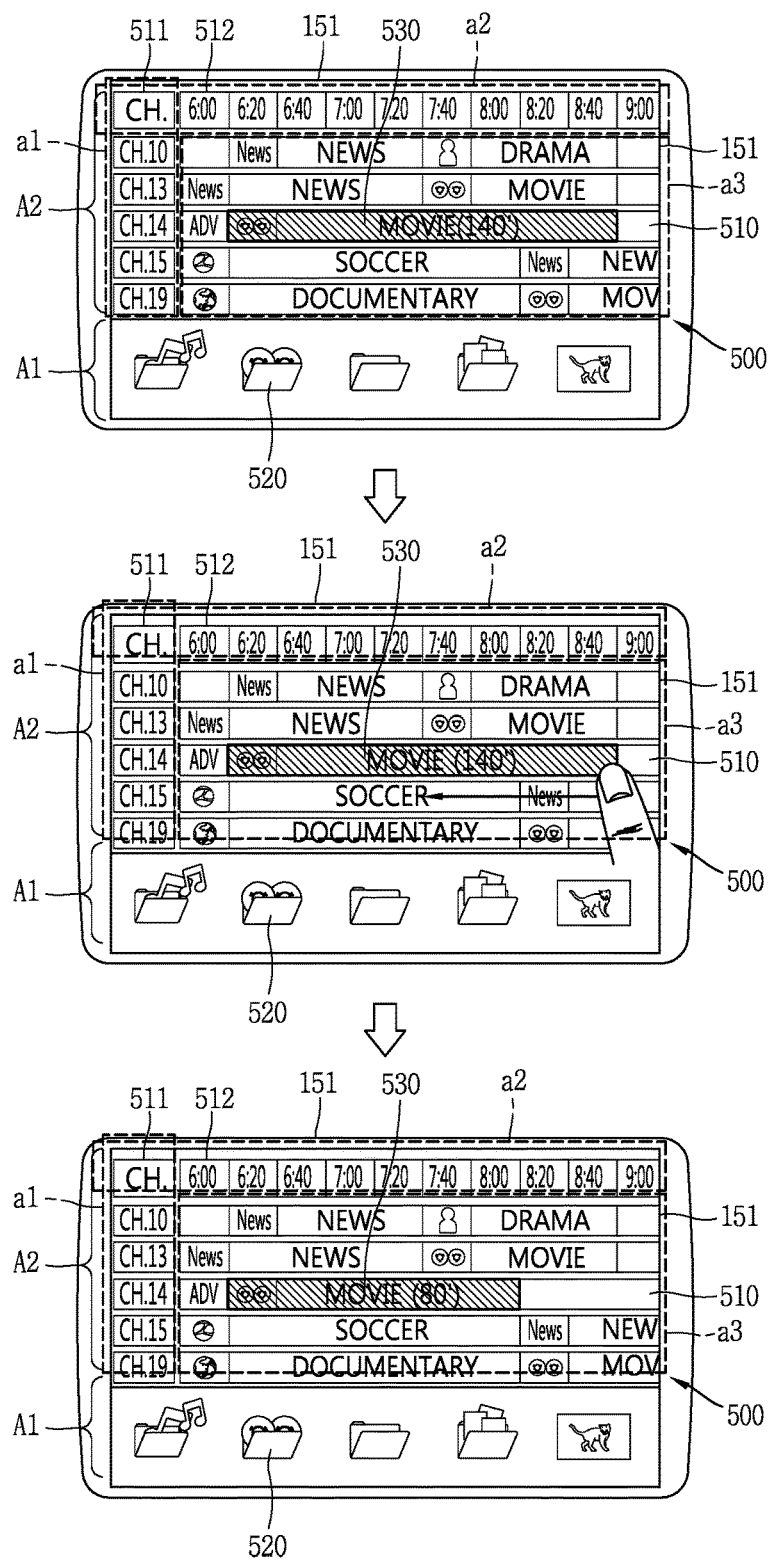
FIG. 4C is a conceptual view illustrating a control method of adjusting an output time of a media content.

Referring to FIG. 4C, the controller 180 may change a shape of the output bar 530 according to a range of the touch. When the length of the output bar 530 is reduced, the controller 180 may change the output time (from 140' to 80') output on the output bar 530. However, the output time may not be output on the output bar 530.

That is, the user can change an output time of a selected media content, which has been set to a specific time of a selected channel, without having to edit the selected media content.

FIGS. 4B and 4C have illustrated the control method of outputting the media content, other than a broadcast content which is output at a specific time, but the controller 180 may generate an output bar for outputting a media content corresponding to an icon when a content which is planed to be output at a specific time on a specific channel is not present.

Figure 4D:
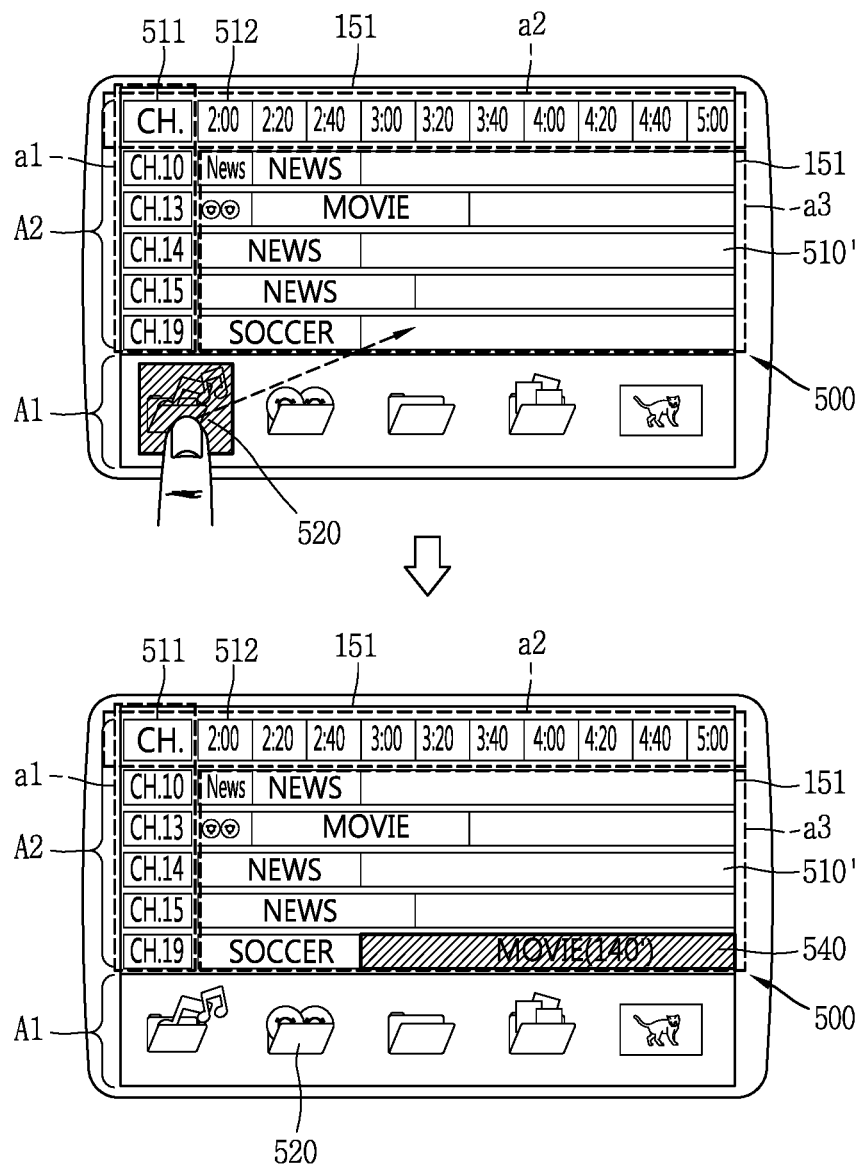
FIGS. 4D and 4E are conceptual views illustrating the control method of FIG. 4A in accordance with another exemplary embodiment.

Referring to FIG. 4D, the controller 180 may generate an empty region 510' on the output bar 510 when a broadcast content to be broadcasted at a specific time is not present, while generating an image when a broadcast content output at the specific time is present. Since a broadcast signal is not received on a corresponding channel at a time corresponding to the empty region 510', the video output device 200 may not output any information.

When a drag touch applied to the icon 520 is released on the image corresponding to the broadcast content, the controller 180 may generate a control command for outputting the media content instead of the broadcast content.

Or, when the drag touch applied to the icon 520 is released on the empty region 510', the controller 180 may generate a control command for outputting the media content at a corresponding time. The touch screen 151 may output an output bar 540 corresponding to the media content on a released region of the drag touch. In this instance, the output bar 540 may be output on the empty region 510'.

According to this embodiment, when a broadcast content which is scheduled at a specific time of a specific channel is not present, a selected media content may be output at the specific time.

Figure 4E:
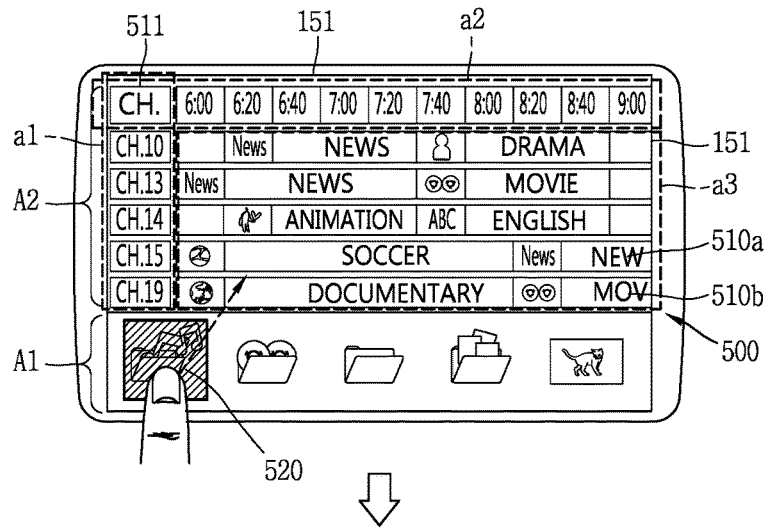
Figure 4E:
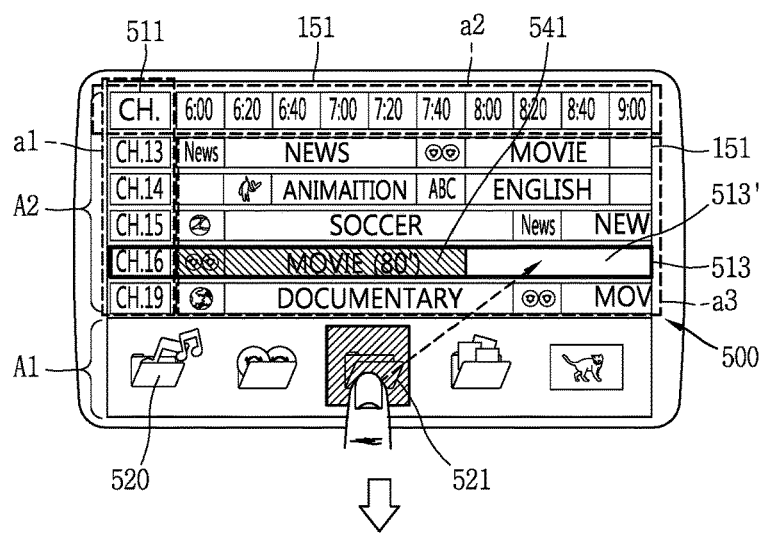
Figure 4E:
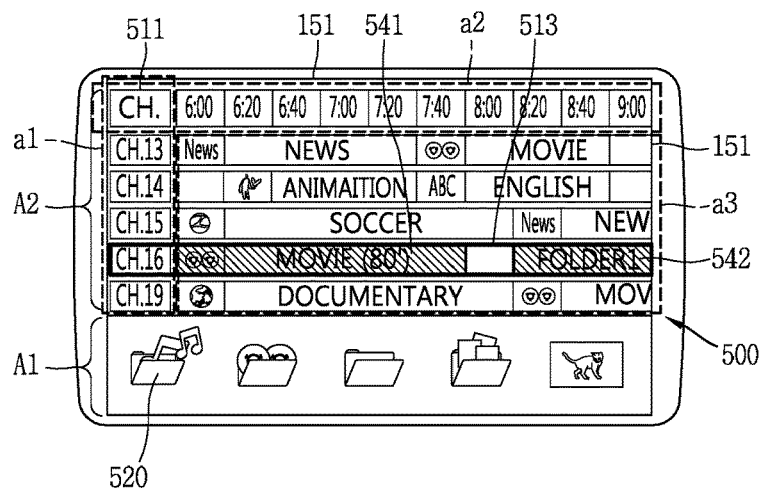

Hereinafter, a control method of generating a virtual channel corresponding to a media content will be described with reference to FIG. 4E. The controller 180 may generate a virtual channel when a drag touch initially applied to the icon 520 included in the first region A1 is released on the third part a3 including a plurality of channel bars 510*a* and 510*b* within the second region A2.

For example, when the drag touch is released between the first and second channel bars 510*a* and 510*b*, the controller 180 may generate a virtual channel bar 513 between the first and second channel bars 510*a* and 510*b*. The touch screen 151 may output a first output bar 541, which indicates an output time of the media content, on one portion of the virtual channel bar 513.

The controller 180 may move the first output bar 541 based on a touch applied to the first output bar 541. That is, the output time of the media content may be set based on the movement of the first output bar 541. Or, the controller 180 may output the first output bar 541 on the virtual channel bar 513 such that the first output bar 541 can be output from a current time.

The controller 180 may generate a second output bar 542 on the virtual channel bar 513, in response to an additional a drag touch, while the first output bar 541 is output on the virtual channel bar 513.

For example, the controller 180 may control the touch screen 151 to output the second output bar 542 corresponding to another icon 521 on an empty region 513' of the virtual channel bar 513 when the drag touch initially applied to the another icon 521 is released on the empty region 513'.

That is, the user can generate one virtual channel outputting only a desired media content and edit the desired media content to be output on the virtual channel.

FIGS. 5A to 5D are conceptual views illustrating a control method of setting an output bar.

Figure 5A:
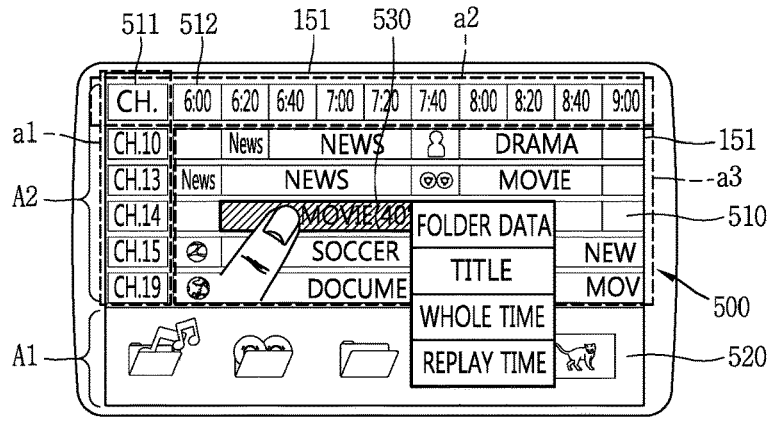
Figure 5A:
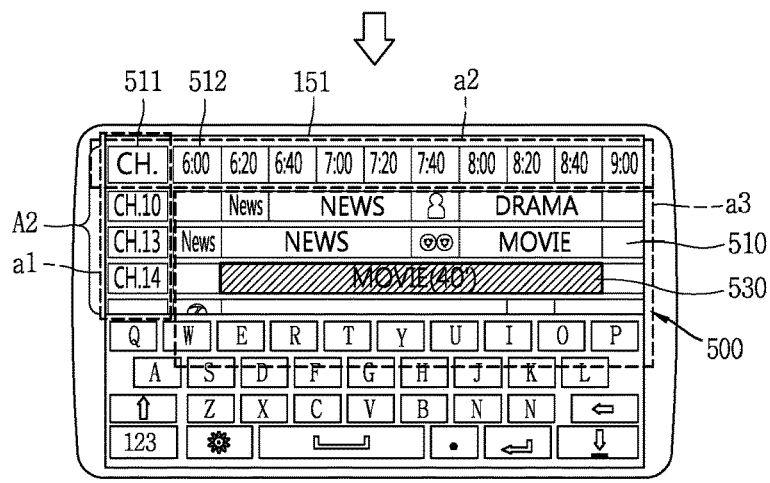
Figure 5A:
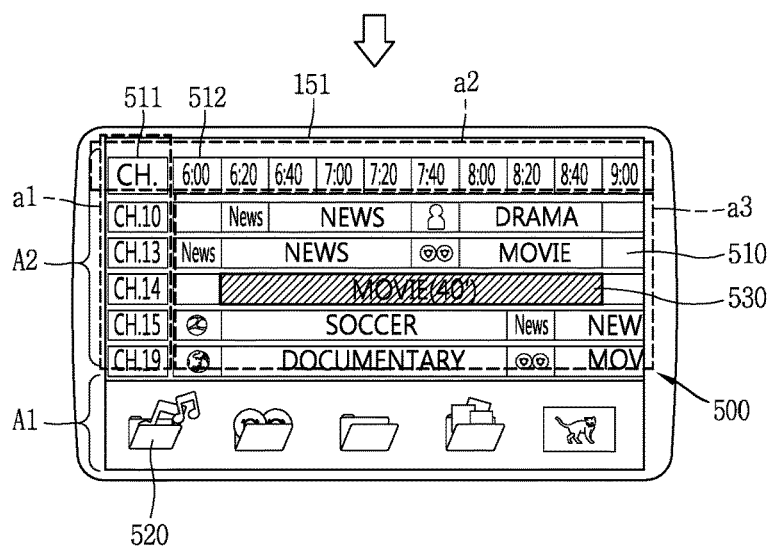

Referring to FIG. 5A, the controller 180 may edit (modify) the output bar 530 based on a touch applied to the output bar 530. In detail, the controller 180 may output a select window for inputting specific information on the output bar 530, and control the touch screen 151 to output a virtual keyboard 601 when a type of specific information (e.g., folder information, a title, a full time, a reproduction time) is selected.

Or, the controller 180 may control the touch screen 151 to output, in the form of text, at least part of folder information including the media content corresponding to the output bar 530, a title of the media content, a full time of the media content, and a reproduction time of the media content, in response to a touch applied to the select window.

The controller 180 may input text on the output bar 530 in response to touches applied to the virtual keyboard 601. The input text may be output along with the media content when the media content corresponding to the output bar 530 is output on the video output device 200.

According to this embodiment, the user can generate the output bar 530 and directly input information regarding the output bar 530.

Figure 5B:
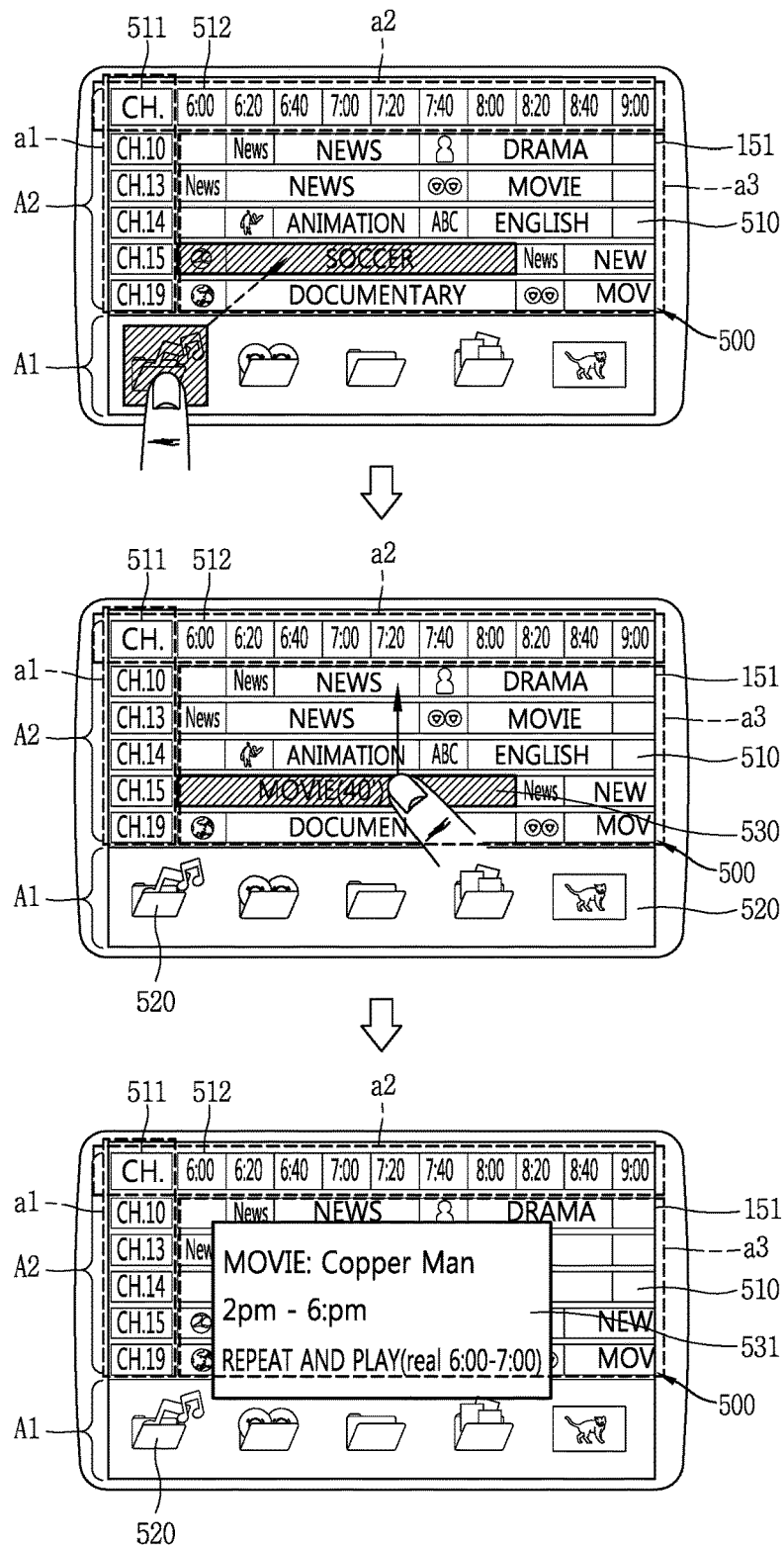

Referring to FIG. 5B, the controller 180 may output the output bar 530 on one portion of the channel bar 510, in response to a drag touch which is initially applied to the icon 520 and released on the channel bar 510 included in the third part a3. Accordingly, the media content corresponding to the output bar 530 may be output on a channel corresponding to the channel bar 510 at a specific time.

The output bar 530 may include brief information (e.g., an output time, etc.) related to the media content. The controller 180 may control the touch screen 151 to output detailed information 531 based on a touch which is moving on the output bar 530 along one direction. The detailed information 531 may be output on a popup window, for example, and disappear when an additional touch input is applied. The popup window including the detailed information 531 may extend from the output bar 530, and an overlapped region with the channel bar 510 may be output semitransparent.

The detailed information 531 may include a title, a category and a related application of the media content, and information related to the output bar 530. The information related to the output bar 530 may include an output time of the media content through the video output device 200, a reproduction type (a repetitive reproduction, a random reproduction, etc.), and the like.

According to this embodiment, the user can check detailed information, which is not included in the output bar 530, on the EPG.

Figure 5C:
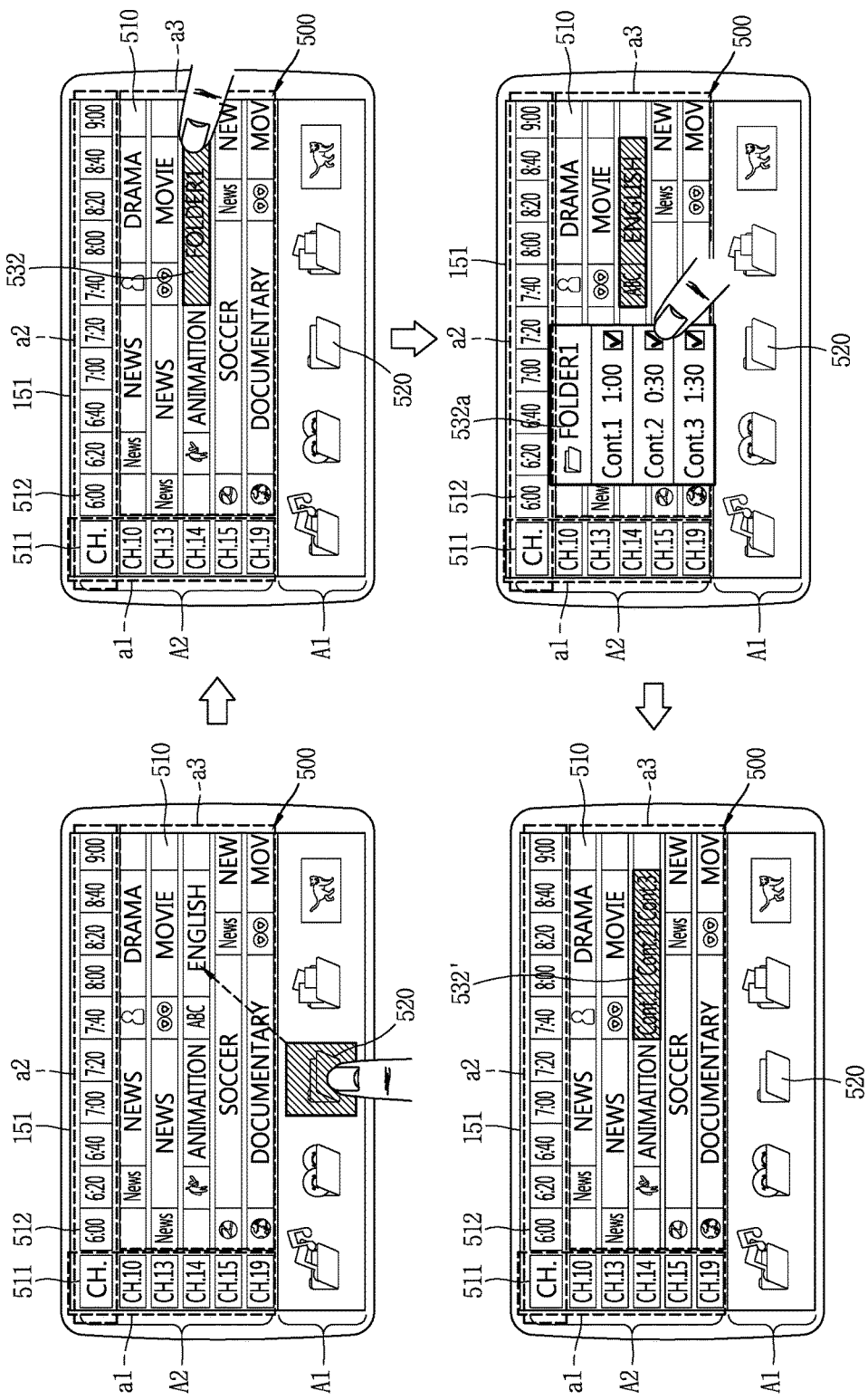

Referring to FIG. 5C, the controller 180 may generate an output bar 532, in response to a drag touch which is initially applied to the icon 520 corresponding to the media content and released on the channel bar 510 included in the third part a3. The output bar 532 may include text indicating the icon 520.

The controller 180 may control the touch screen 151 to output a contents list 532*a* corresponding to the icon 520, in response to a touch applied to the output bar 532. The contents list 532*a* may include a plurality of media contents corresponding to the icon 520, and include check boxes for outputting media contents to be output through the video output device 200 among the plurality of media contents. The contents list 532*a* may also include reproduction time of each of the plurality of media contents.

For example, when the icon 520 corresponds to a folder including various images, the plurality of media contents included in the folder can all be output. Also, FIG. 5C illustrates the contents list 532*a* in the form of the popup window, but the present invention may not be limited to this. For example, when there are a lot of media contents, screen information including the contents list 532*a* may be output.

The controller 180 may generate a reproduction content to be output, by using media contents selected among the plurality of media contents. The controller 180 may generate the reproduction content using an output time corresponding to a length of the output bar 532 and the selected plurality of media contents. That is, when a large amount of media contents is selected within a limited time corresponding to the output bar 532, an output time of each media content may be reduced.

The touch screen 151 may output a transformed output bar 532' including a type of the reproduction content. The transformed output bar 532' may include information related to types and output order of the plurality of media contents included in the reproduction content. The controller 180 may change the output order of the plurality of media contents based on a touch applied to the contents list 532*a*.

According to this embodiment, when there are a plurality of media contents corresponding to the selected icon, the user can generate the output bar merely by combining some of the plurality of media contents.

Referring to FIG. 5D, the controller 180 may control the touch screen 151 to output the output bar 530 on one portion of the channel bar 510, in response to a drag touch which is initially applied to the icon 520 and released on the channel bar 510 included in the third part a3.

The controller 180 may generate the output bar 530 based on a reproduction time of the media content corresponding to the icon 520, and output a reproduction edit window 541 including a graphic image related to the reproduction time of the media content. The reproduction edit window 541 may be output on one region of the touch screen, and preferably be output adjacent to the output bar 530.

When the media content is a video, a reproduction speed when reproducing the video at normal speed may be an output speed of the media content. When the media content is a plurality of information which is irrespective of the time-based order, the output speed may be calculated based on a preset reproduction time corresponding to one information.

The controller 180 may change the output time when a touch is applied to the graphic image of the reproduction edit window 541. When the output time is changed, the controller 180 may generate a reproduction content only by using a part of the video, or adjust the reproduction speed of the video. When the media content is the plurality of information, the output speed can be changed. It has been illustrated in the drawing that the output time of the media content is reduced, but a control of increasing the output time of the media content based on a touch applied to the reproduction edit window 541 can be implemented.

According to this embodiment, after the output bar corresponding to the selected media content is generated on the channel bar, the output time of the media content can be changed after checking the output bar and the channel bar. Consequently, even when it is failed to predict the reproduction time of the media content, the output time of the media content can change by considering an output time of a broadcast content included in the channel bar.

Figure 6A:
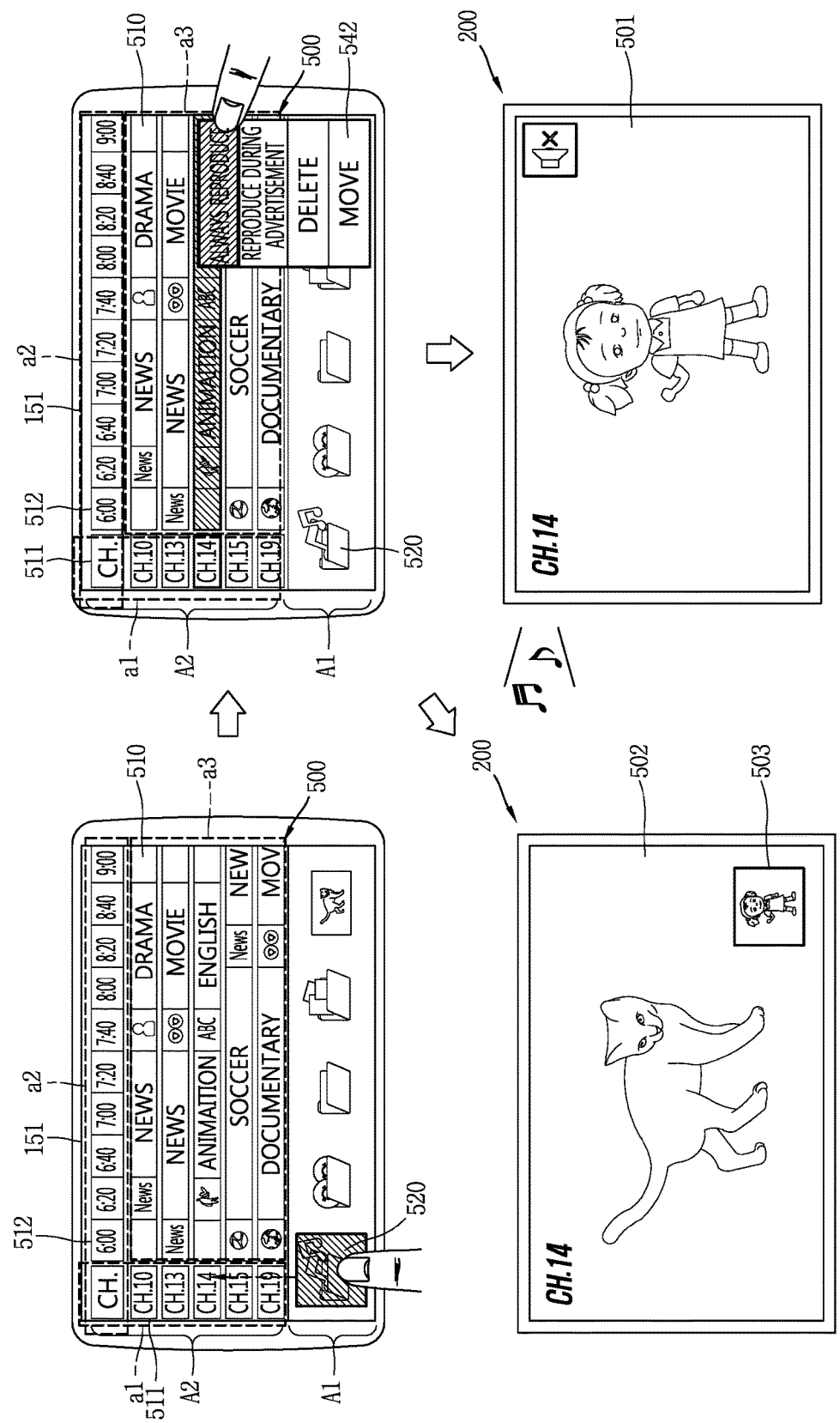
FIGS. 6A and 6C are conceptual views illustrating a control method of selecting channel information for outputting a media content.
Figure 6B:
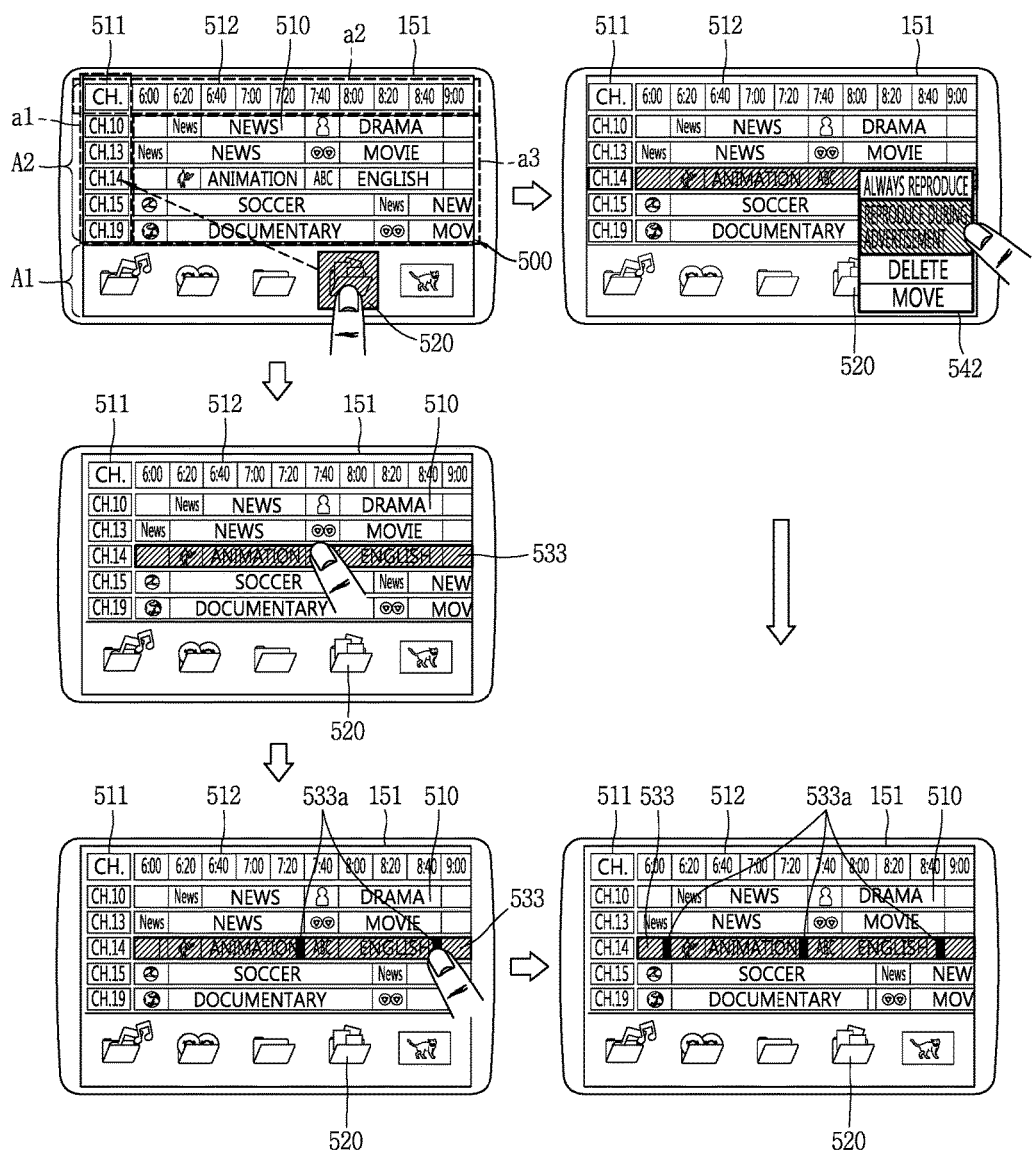

FIGS. 6A and 6B are conceptual views illustrating a control method of selecting channel information for outputting a media content.

Referring to FIG. 6A, the controller 180 may match channel information 511 included in the first part a1 with the media content, in response to a drag touch which is initially applied to the icon 520 and released on the channel information 511. In this instance, the controller 180 may not set an output time to output the media content.

The controller 180 may output a time select window 542 for setting an output time for outputting the media content while the channel information is selected. The time select window 542 may include a first option always outputting the media content on the channel, a second option outputting the media content instead of a broadcast content corresponding to an advertisement, a deletion of settings of the media content, a movement to another channel information, and the like.

For example, when the first option is selected, the touch screen 151 may change the entire channel bar 510 corresponding to the selected channel information 511 into the output bar 530. In this instance, the video output device 200 may output the selected media content in every time slot.

Referring to FIG. 6A, when the media content includes visual data, the media content 502 may be output on the video output device 200. In this instance, the video output device 200 may output a thumbnail image 503 of a broadcast content, which corresponds to a received broadcast signal, while the media content 502 is output.

On the other hand, when the media content is audible data, the video output device 200 may output a broadcast content 501 corresponding to a received broadcast signal, and output the media content instead of audible information included in the broadcast content 501. That is, the video output device 200 may output the selected media content while the channel information is selected.

According to this embodiment, the user can match a specific channel with media contents stored in the mobile terminal 100. Accordingly, an output of a part of a broadcast content of the corresponding channel information can be restricted without a limit of time.

Referring to FIG. 6B, the controller 180 may select one of a plurality of channel information, in response to a drag touch which is initially applied to the icon 520 and released on channel information 511 included in the first part a1.

The controller 180 may output an edition bar 533 on the selected one channel bar 510. The edition bar 533 may include dividing lines for separating a plurality of broadcast contents corresponding to the channel information and forming the channel bar 510. The controller 180 may select one of the plurality of broadcast contents based on a touch applied to one portion of the channel bar 510.

The touch screen 151 may set the media content corresponding to the icon to be output instead of the broadcast content selected based on the touch, and output an indicator 533a on one portion of the channel bar 510 to which the media content has been set (or on which the media content is to be output). The indicator 533a may be in plurality based on a number of touches applied to the edition bar 533, and set in a consecutive or non-consecutive manner. A broadcast content corresponding to the channel information may be output in time slots corresponding to the other portion of the channel bar 510 without the set indicator 533a.

On the other hand, when the second option outputting the media content during an advertisement is selected on the time select window 542, the controller 180 may generate or output the edition bar 533 including the indicator 533a corresponding to a time slot for which an advertisement content is output. That is, the controller 180 may extract broadcast contents belonging to an advertisement category using the received EPG information, and set the media content to be output instead of the advertisement contents.

The advertisement content has been exemplarily illustrated in the drawing, but the present invention may not be limited to this. When the broadcast contents belong to a plurality of categories, the controller 180 may change broadcast contents corresponding to a selected category into the media content.

According to this embodiment, the user can selectively change some of a plurality of broadcast contents corresponding to channel information into a media content, and selectively change broadcast contents belonging to a specific category into the media content. The user can restrict an output of broadcast contents which the user does not want to receive by pre-selecting broadcast contents to change.

Figure 6C:
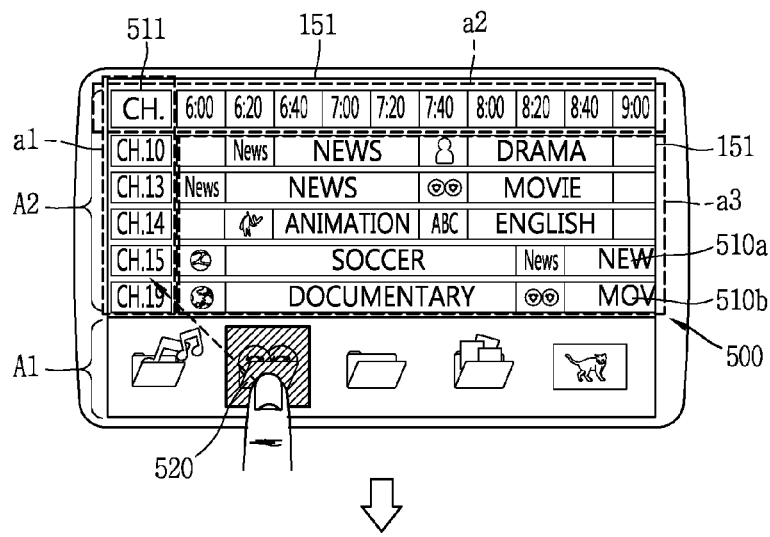
Figure 6C:
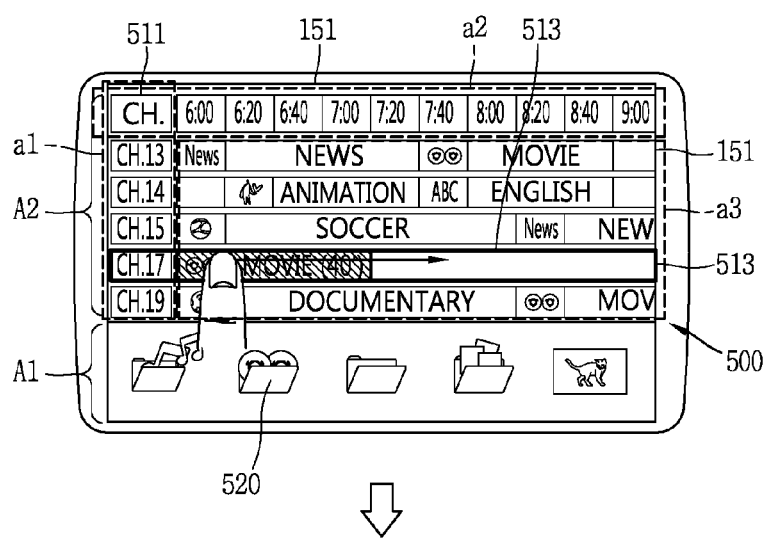
Figure 6C:
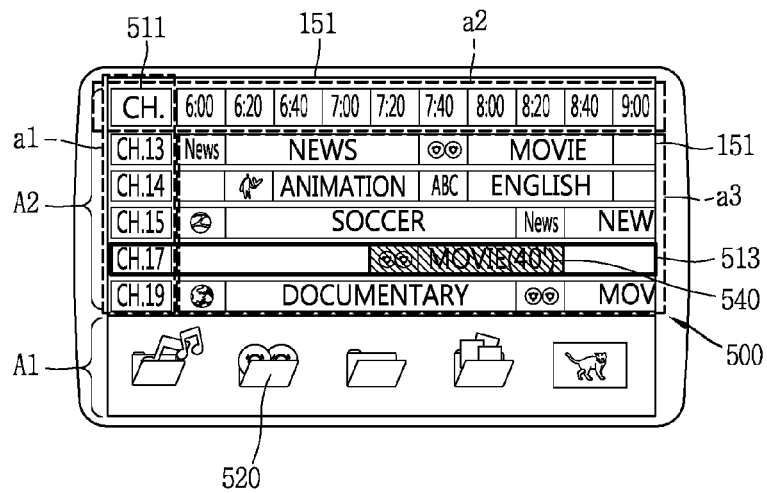

Hereinafter, a control method of generating a virtual channel bar based on a touch applied to a first region will be described with reference to FIG. 6C. The controller 180 may generate a virtual channel when a drag touch initially applied to the icon 520 is released on the first part a1 outputting channel information 511 within the second region A2.

A virtual channel bar 513 corresponding to the virtual channel may be output on the third part a3, and an output position of the virtual channel corresponding to the virtual channel bar 513 may not be limited to this. For example, the virtual channel may be generated to be the last channel or the first channel, or to be provided with a preset channel number. Also, the controller 180 may change the output position of the virtual channel bar 513 based on a touch applied to the channel information of the virtual channel bar 513. The touch screen 151 may output an output bar 540 indicating an output time of the media content on one portion of the virtual channel bar 513.

The controller 180 may move the output bar 540 on the virtual channel bar 513, in response to a touch applied to the output bar 540. That is, the output time of the media content may be set based on the movement of the output bar 540. Or, the controller 180 may control the output bar 540 to be output on the virtual channel bar 513 from a current time.

That is, when a drag touch is released on the second region A2, a virtual channel outputting only a media content may be generated.

Figure 7A:
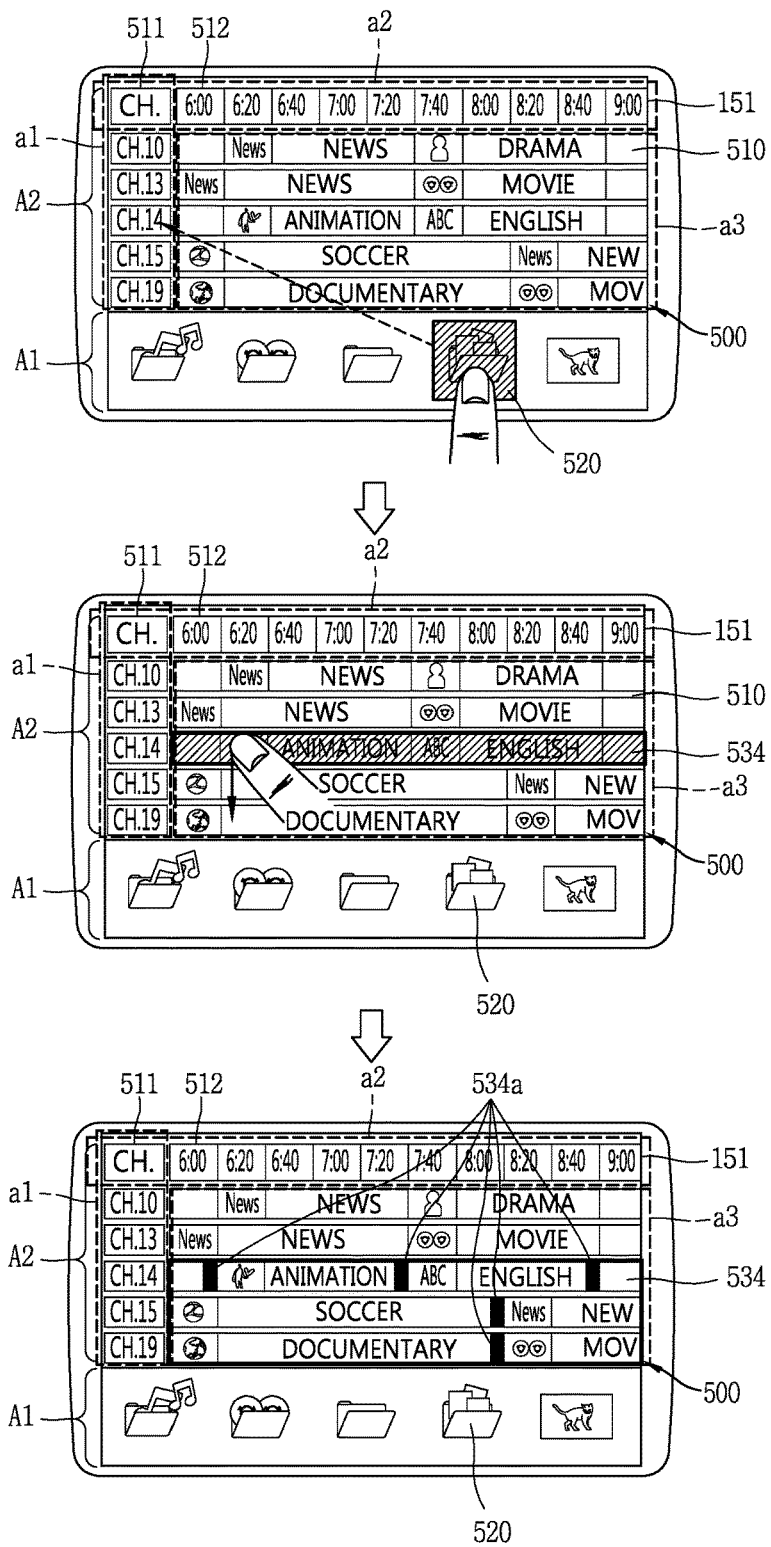
FIGS. 7A to 7C are conceptual views illustrating a control method of extending setting of an output of a media content.
Figure 7B:
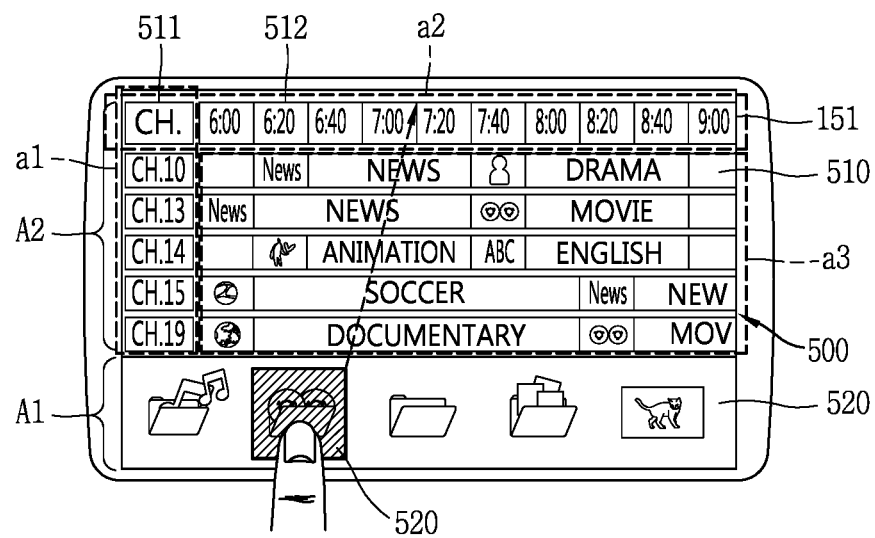
Figure 7B:
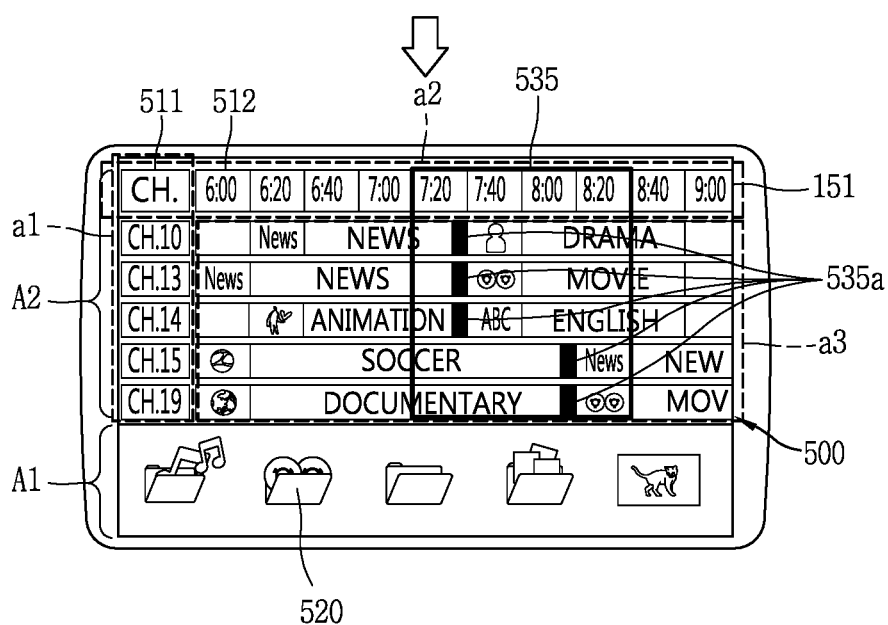
Figure 7C:
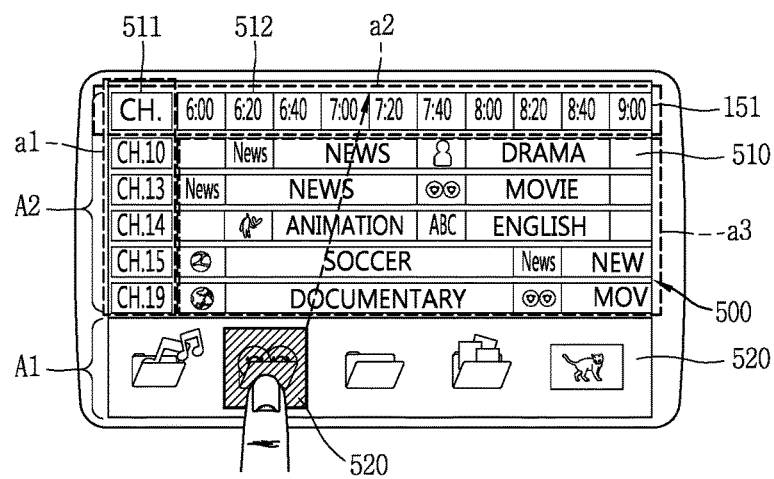
Figure 7C:
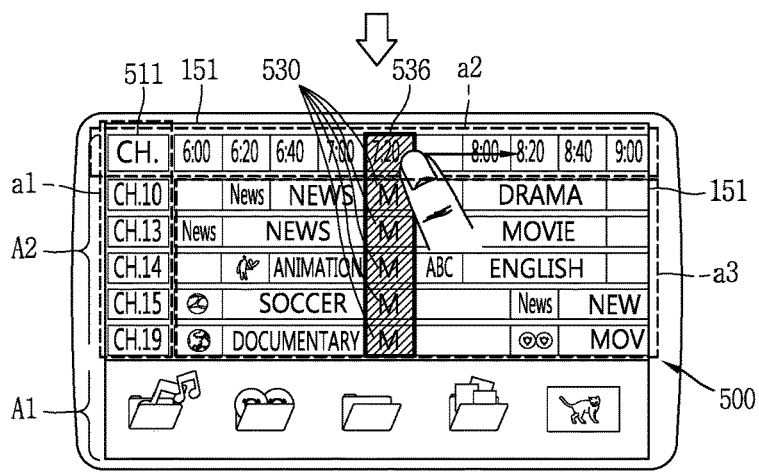
Figure 7C:
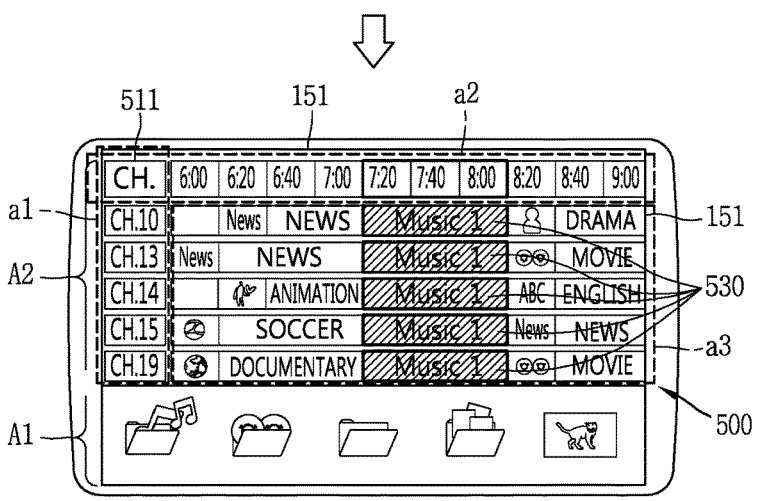

FIGS. 7A to 7C are conceptual views illustrating a control method of extending setting of an output of a media content.

Referring to FIG. 7A, one of the plurality of channel bars 510 may be selected, in response to a drag touch which is initially applied to the icon 520 and released on the channel information 511 included in the second part a2. The controller 180 may change the selected one channel bar 510 into an edition bar 534. The controller 180 may extend the edition bar 534 based on a touch input moving from the edition bar 534 in one direction.

In response to the extension of the edition bar 534, the plurality of channel bars 510 may be selected. The controller 180 may extract broadcast contents of a specific category included in the plurality of channel bars 510, which have been selected in response to the extension of the edition bar 534. For example, the controller 180 may extract advertisement contents.

The controller 180 may output an indicator 534a on one portion of each of the selected plurality of channel bars 510 corresponding to the advertisement contents. The controller 180 may set the media content to be output based on the channel information and a time slot corresponding to the indicator 534a.

However, the controller 180 may release the output of the indicator 534a or add an additional indicator 534a, in response to a touch additionally applied to the edition bar 534. That is, the user can add or release the setting of the media content based on a touch input additionally applied during the output of the edition bar 534.

According to this embodiment, the user can change all of broadcast contents, which are included irrespective of channel information and belong to substantially the same category, into a media content.

Referring to FIG. 7B, when the drag touch initially applied to the icon 520 is released on the second part a2, the controller 180 may control the media content to be output instead of a broadcast content belonging to a specific category of a specific time slot. In detail, when the drag touch initially applied to the icon 520 is released on one portion of the time bar 512, a broadcast content which is planned (scheduled) to be output in the specific time slot may be selected. The touch screen 151 may output an edition region 535 based on the drag touch. In this instance, the channel information may not be limited and may include a plurality of channel information provided to the video output device 200. The controller 180 may extend a time slot selected based on a touch applied to the edition region 535.

The controller 180 may extract broadcast contents belonging to a specific category from broadcast contents included in the edition region 535, and set the media content corresponding to the icon 520 to be output instead of the broadcast contents. For example, the broadcast contents belonging to the specific category may correspond to advertisement contents. An indicator 535a may be output on one portion of the edition region 535 corresponding to the media content to be output.

The controller 180 may release the output of the indicator 535a or add an additional indicator 535a based on a touch additionally applied to the edition bar 535. That is, the user can add or release the setting of the media content, based on a touch input additionally applied during the output of the edition bar 535.

Or, the controller 180 may control the media content to be output instead of all of broadcast contents received in the same time slot. In this instance, the user can be provided with the media content, instead of the broadcast contents, on every channel belonging to the selected time slot.

According to this embodiment, the user can seamlessly change into a media content, broadcast contents belonging to substantially the same category among broadcast contents included in the same time slot, irrespective of channel information. Also, the user can output only the media content on the video output device within the same time slot.

Referring to FIG. 7C, when the drag touch initially applied to a specific time slot is released on the second part a2, the controller 180 may control the selected media content to be output on every channel within the specific time slot.

The controller 180 may select every broadcast content planned (scheduled) to be output in a specific time slot from the time bar 512 of the second part a2, and output the output bar 530 of the media content on all of the selected broadcast contents.

The touch screen 151 may output an edition region 536 indicating the time slot. The controller 180 may increase or decrease the time slot based on a touch applied to the edition region 536.

The controller 180 may generate a control command for outputting the media content corresponding to the icon 520 on every channel within the selected time slot.

Figure 8:
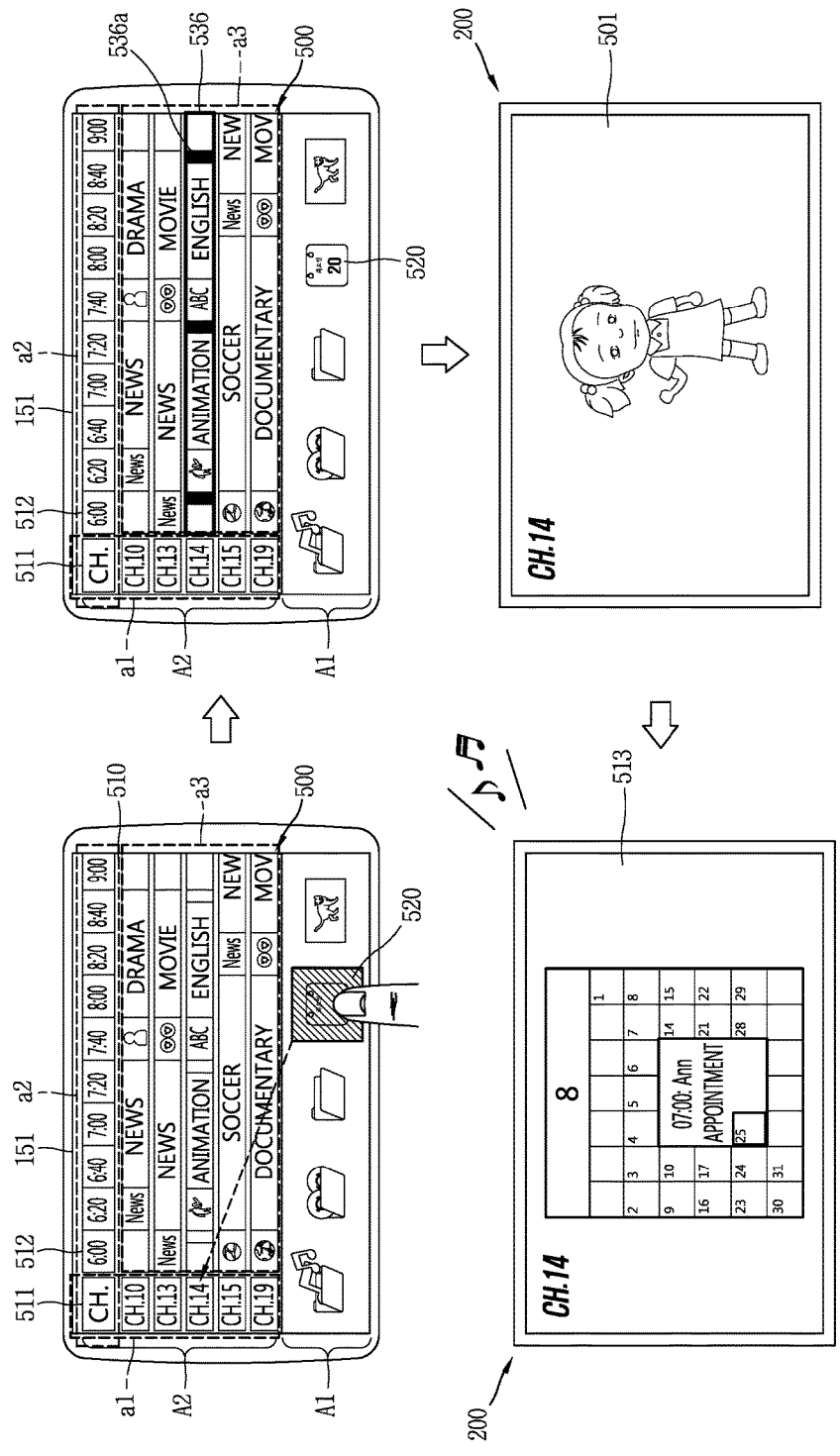
FIG. 8 is a conceptual view illustrating a control method of executing an application of a mobile terminal on a specific channel.

FIG. 8 is a conceptual view illustrating a control method of executing an application of a mobile terminal on a specific channel.

The controller 180 may set an application, instead of a part of broadcast contents corresponding to specific channel information 511 included in the first part a1, in response to a touch initially applied to the icon 520 and released on the channel information 511. Here, the icon 520 may correspond to an icon of a specific application installed on the mobile terminal.

The controller 180 may extract notification information corresponding to the specific application. The specific application may include a function of outputting the notification information at a specific time. For example, the specific application may correspond to a calendar application.

The controller 180 may control the touch screen 151 to output an edition bar 536 including indicators 536a each indicating the notification information which is to be output instead of the broadcast content, based on visual information included in the notification information.

Although not illustrated in detail, the controller 180 may set an execution screen of the application to be output, instead of a specific broadcast content, which is selected based on a touch applied to the edition bar 536.

Or, when an event associated with the application corresponding to the icon 520 is generated during the output of the broadcast content corresponding to the channel information, the controller 180 may set notification information related to the event to be output for a preset period of time (several seconds).

The video output device 200 may output the notification information 513 when a time slot for which the application was set reaches while outputting the broadcast content 501.

According to this embodiment, the user can be provided with information related to a desired specific application, without using the mobile terminal or changing a channel, when desiring to view notification information of the specific application or an execution screen of the specific application while viewing the video output device.

Figure 9A:
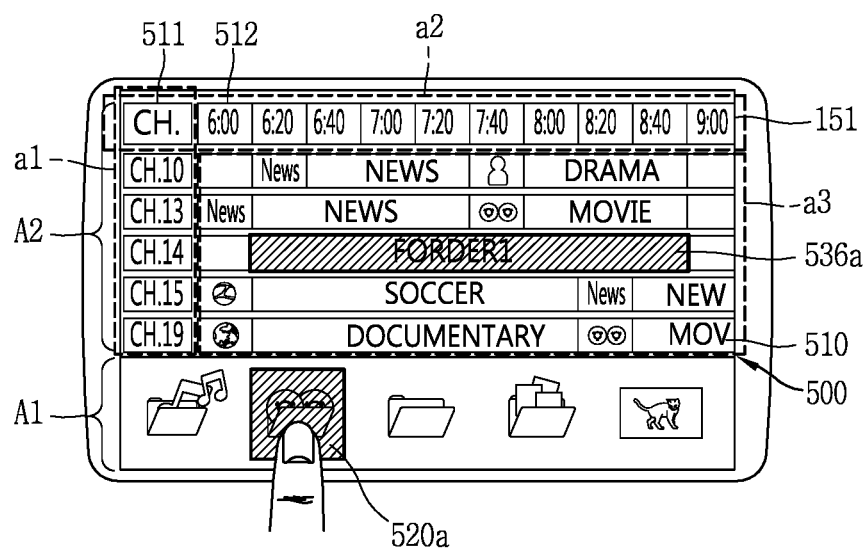
FIGS. 9A to 9C are conceptual views illustrating a control method of selecting a media content to be output on a video output device.
Figure 9A:
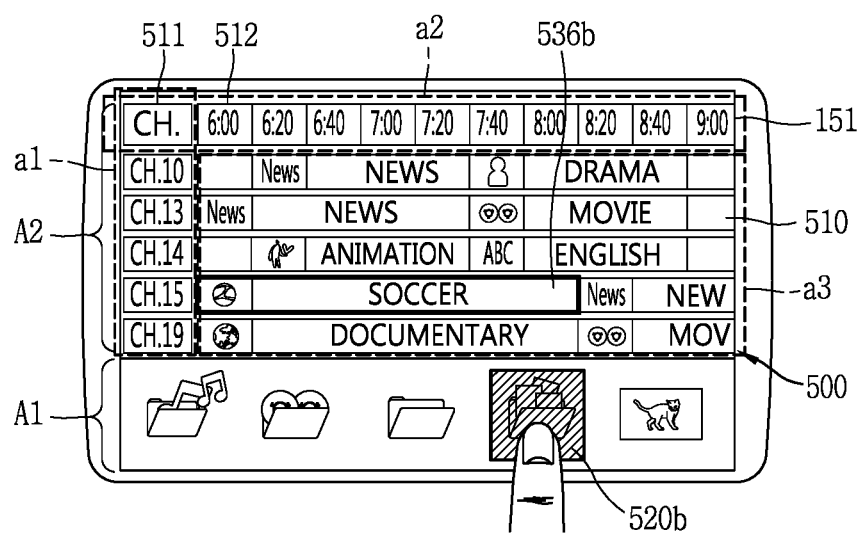
Figure 9B:
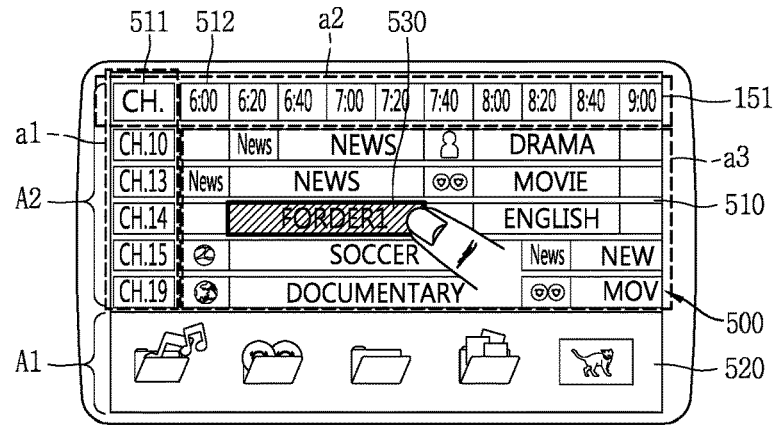
Figure 9B:
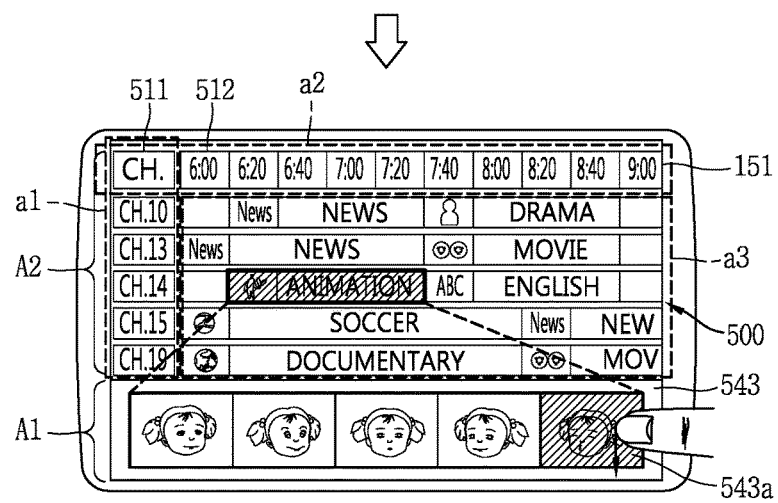
Figure 9B:
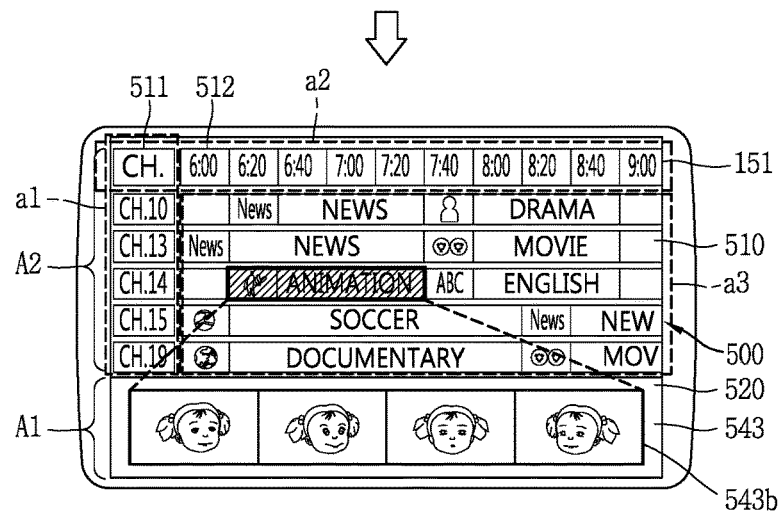
Figure 9C:
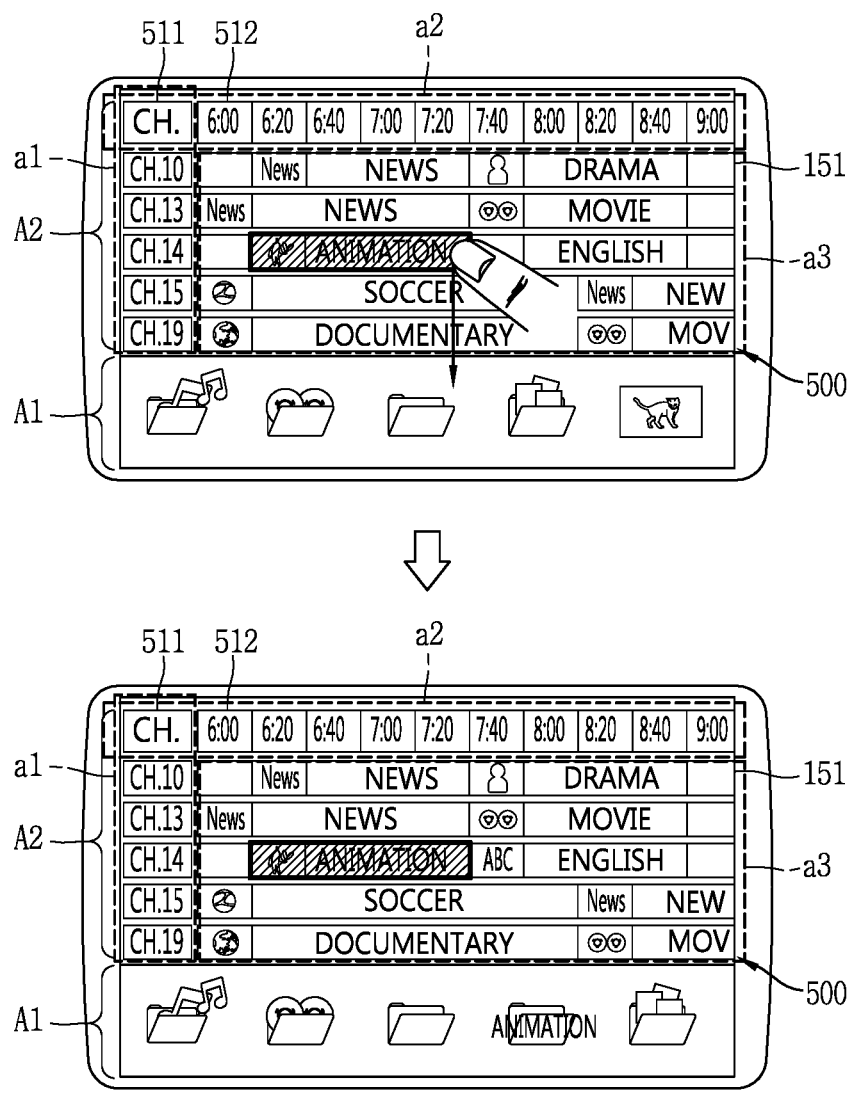

FIGS. 9A to 9C are conceptual views illustrating a control method of selecting a media content output on a video output device.

Referring to FIG. 9A, the touch screen 151 may include a plurality of channel bars 510, a plurality of channel information 511 corresponding to the plurality of channel bars 510, a time bar 512, and at least one icon.

When a first icon 520a is selected from the at least one icon, the controller 180 may control the touch screen 151 to highlight at least one first output bar 536a for which a media content corresponding to the first icon 520a has been set. Also, when a second icon 520b different from the first icon 520a is selected, the controller 180 may control the touch screen 151 to highlight a second output bar 536b for which a media content corresponding to the second icon 520b has been set.

According to this embodiment, the user can check channel information with a set media content, without searching for every channel bar included in the EPG.

Referring to FIG. 9B, the controller 180 may control the touch screen 151 to output a media content 543, which includes a plurality of information 543a corresponding to the output bar 530, in response to a touch applied to a preset output bar 530. When the media content 543 is a plurality of images or a video file reproduced according to a flow of time, the plurality of information 543a may correspond to thumbnail images. A size of each of the plurality of information 534a may indicate a reproduction time of each information.

The controller 180 may delete a part of the plurality of information in response to a touch applied to the part of the plurality of information 543a. In this instance, the other information may increase in size.

According to this embodiment, the user can delete a part of a preset media content.

Referring to FIG. 9C, the controller 180 may additionally generate an icon corresponding to a media content corresponding to a preset output bar, in response to a touch applied to one region outputting thereon the output bar and the icons. The media content corresponding to the output bar may include a reproduction time, and output information with edited information, based on a user's control command.

Accordingly, the user can add an output bar, without a separate edition step, in response to a touch applied to the added icon.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal performing wireless communication with a video output device for outputting a received broadcast content, the mobile terminal comprising:
 a wireless communication unit capable of transmitting a media content outputtable by the video output device to the video output device and receiving information about broadcast programs broadcasted in each channel from the video output device;
 a touch screen divided into a first region outputting an icon corresponding to the media content, and a second region including a time bar extending in one direction to indicate a time, and a channel bar indicating output time information related to each of a plurality of broadcast contents and extending in the one direction; and
 a controller capable of controlling the touch screen to output an output bar indicating a reproduction time of the media content on a part of the second region, when a drag touch applied to the icon is released on the second region,
 wherein the controller generates a control command for outputting the media content on the video output device, instead of some broadcast contents of the plurality of broadcast contents, at a time corresponding to an output position of the output bar within the second region,
 wherein the controller outputs a time select window when the drag touch is applied to a region corresponding to the channel bar,
 wherein time select window includes a first option of always outputting the media content on the channel, and a second option outputting the media content instead of a predetermined content,
 wherein the controller changes a portion of the channel bar corresponding to selected channel information into the output bar when the first option is selected, and
 wherein the controller extracts broadcast contents belonging to the predetermined content using the received information and changes the extracted broadcast contents to the media content when the second option is selected.

2. The terminal of claim 1, wherein the controller calculates an output time based on a reproduction time of a selected media content, and generates the channel bar with a length corresponding to the output time.

3. The terminal of claim 2, wherein the controller changes the output time when a touch is applied to the output bar.

4. The terminal of claim 3, wherein the controller selects part of a plurality of information, in response to a touch applied to the channel bar, when the media content includes the plurality of information.

5. The terminal of claim 2, wherein the controller controls the touch screen to output detailed information related to the media content corresponding to the output bar, in response to a touch applied to the output bar.

6. The terminal of claim 1, wherein the controller controls the touch screen to output a contents list for selecting at least part of a plurality of contents included in the media content, and wherein the controller generates the output bar using the selected at least part of the contents.

7. The terminal of claim 6, wherein the output bar includes information indicating each of the plurality of contents output in a sequential manner.

8. The terminal of claim 1, wherein the touch screen outputs a reproduction edit window indicating a reproduction time of the media content, and
wherein the controller sets the reproduction time, which has changed in response to a touch applied to the reproduction edit window, as an output time.

9. The terminal of claim 1, wherein the second region is divided into a first part including channel information related to the broadcast contents, a second part including a time bar for outputting an output time of each of the broadcast contents, and a third part including the channel bar.

10. The terminal of claim 9, wherein the controller controls the touch screen to output the output bar on the channel bar selected based on a touch-released point in the third part.

11. The terminal of claim 9, wherein the controller sets the media content to correspond to one channel information selected from the plurality of channel information, in response to a drag touch initially applied to the icon and released on the first part.

12. The terminal of claim 11, wherein the controller extracts contents of a specific category, among broadcast contents corresponding to the one channel information, and sets the media content to be output, instead of the extracted broadcast contents, and
wherein the touch screen outputs an indicator on one portion of the channel bar corresponding to each of the extracted broadcast contents.

13. The terminal of claim 12, wherein the touch screen outputs an edition bar including dividing lines for dividing the plurality of contents corresponding to the channel information, on the channel bar, in response to a drag input initially applied to the icon and released on the first part, and
wherein the controller sets the media content based on an additional touch applied to the edition bar, and controls the touch screen to output the indicator on one portion of the edition bar, to which the additional touch is applied.

14. The terminal of claim 9, wherein the controller sets an edition region including broadcast contents corresponding to a time range, selected in response to a drag touch initially applied to the icon and released on the second part.

15. The terminal of claim 14, wherein the controller selects broadcast contents belonging to a specific category among the broadcast contents included in the edition region, and
wherein the touch screen outputs an indicator indicating the media content on portions of the channel bar corresponding to the selected contents.

16. The terminal of claim 9, wherein the icon corresponds to an icon of a specific application installed on the mobile terminal, and
wherein the media content corresponds to a notification image output at a prestored time, or an execution screen of the application.

17. The terminal of claim 16, wherein the controller sets the media content to be output when an event is generated from the specific application, in response to a drag touch initially applied to the icon and released on the channel information within the first part.

18. The terminal of claim 1, wherein the controller controls the touch screen to highlight an output bar corresponding to the icon when a touch is applied to the icon.

19. The terminal of claim 1, wherein the controller controls the wireless communication unit to transmit the media content corresponding to the output bar to the video output device after the output bar is generated.

20. The terminal of claim 1, wherein the controller, when the output bar is output on one portion of the reproduction bar, generates a control command for consecutively outputting a broadcast content corresponding to the other portion of the reproduction bar and the media content corresponding to the output bar, with respect to the channel information corresponding to the reproduction bar.

21. A method for controlling a mobile terminal, the method comprising:
performing wireless communication with a video output device outputting a received broadcast content and receiving information about broadcast programs broadcasted in each channel from the video output device;
transmitting a media content outputtable by the video output device to the video output device;
outputting an icon corresponding to the media content on a first region of a touch screen, and outputting on a second region a time bar extending in one direction to indicate a time, and a channel bar indicating output information related to an output time of each of a plurality of broadcast contents and extending in the one direction;
outputting an output bar indicating a reproduction time of the media content on one portion of the channel bar when a drag touch applied to the icon is released on the second region; and
generating a control command for outputting the media content on the video output device, instead of some of the plurality of broadcast contents at a time corresponding to an output position of the output bar;
wherein the method further comprises:
outputting a time select window when the drag touch is applied to a region corresponding to the channel bar, wherein time select window includes a first option of always outputting the media content on the channel, and a second option outputting the media content instead of a predetermined content;
changing a portion of the channel bar corresponding to selected channel information into the output bar when the first option is selected; and
extracting broadcast contents belonging to the predetermined content using the received information and changing the extracted broadcast contents to the media content when the second option is selected.

22. The method of claim 21, wherein the outputting the output bar indicating the reproduction time of the media content on the one portion of the channel bar comprises:
calculating an output time based on the reproduction time of a selected media content; and
generating the output bar with a length corresponding to the output time.

* * * * *